United States Patent
Choi et al.

(10) Patent No.: US 10,256,847 B2
(45) Date of Patent: Apr. 9, 2019

(54) METHOD AND TERMINAL DEVICE FOR EXECUTING RADIO APPLICATION

(71) Applicant: NEO SASTECH CO., LTD., Seongdong-gu, Seoul (KR)

(72) Inventors: Seung Won Choi, Seoul (KR); Dong Hyun Kuem, Gyeonggi-do (KR); Yong Jin, Seoul (KR); Kyung Hoon Kim, Seoul (KR)

(73) Assignee: NEO SASTECH CO., LTD., Seoul (KR)

( * ) Notice: Subject to any disclaimer, the term of this patent is extended or adjusted under 35 U.S.C. 154(b) by 0 days.

(21) Appl. No.: 15/504,914

(22) PCT Filed: Aug. 19, 2015

(86) PCT No.: PCT/KR2015/008665
§ 371 (c)(1),
(2) Date: Feb. 17, 2017

(87) PCT Pub. No.: WO2016/028086
PCT Pub. Date: Feb. 25, 2016

(65) Prior Publication Data
US 2017/0273068 A1 Sep. 21, 2017

(30) Foreign Application Priority Data

Aug. 20, 2014 (KR) .................. 10-2014-0108154
Aug. 19, 2015 (KR) .................. 10-2015-0116498

(51) Int. Cl.
*H04B 1/00* (2006.01)
*H04W 4/60* (2018.01)
(Continued)

(52) U.S. Cl.
CPC ........... *H04B 1/0003* (2013.01); *H04B 1/001* (2013.01); *H04B 1/0014* (2013.01);
(Continued)

(58) Field of Classification Search
CPC .... H04B 1/0003; H04B 1/001; H04B 1/0014; H04B 1/0025; H04B 1/0032; H04B 1/0035; H04B 1/0039
See application file for complete search history.

(56) References Cited

U.S. PATENT DOCUMENTS 7,551,988 B1 6/2009 Wichgers et al.
8,565,811 B2 * 10/2013 Tan ..................... G06F 13/28
455/550.1
(Continued)

FOREIGN PATENT DOCUMENTS

JP 2010-231809 A 10/2010
KR 10-2012-0052858 A 5/2012
KR 10-2013-0116039 A 10/2013

OTHER PUBLICATIONS

U.S. Appl. No. 61/943,948, RF protection class for software components in mobile device plaforms, Feb. 24, 2014.*
(Continued)

*Primary Examiner* — Duc M Nguyen
(74) *Attorney, Agent, or Firm* — Sughrue Mion, PLLC

(57) ABSTRACT

A method and terminal device for executing a radio application is disclosed. The method for executing a radio application is a method for executing a radio application independent of a modem in a terminal device, comprising the steps of: communicating with each other using a reconfigurable radio frequency interface (RRFI) by a unified radio application (URA), which operates on a radio computer of the terminal device, and a radio frequency (RF) transceiver, which operates in a radio platform on the radio computer; and supporting, by the RRFI, at least one service among a spectrum control service, a power control service, an antenna management service, a transmission/reception chain control service, and a radio virtual machine protection service.

18 Claims, 14 Drawing Sheets

(51) Int. Cl.
*H04L 27/00* (2006.01)
*H04W 88/06* (2009.01)

(52) U.S. Cl.
CPC ......... *H04B 1/0025* (2013.01); *H04B 1/0032* (2013.01); *H04L 27/0002* (2013.01); *H04W 4/60* (2018.02); *H04W 88/06* (2013.01)

(56) References Cited

U.S. PATENT DOCUMENTS

| | | | | |
|---|---|---|---|---|
| 2005/0027789 A1* | 2/2005 | Luo | .................. | G06F 9/4881 709/200 |
| 2005/0059427 A1* | 3/2005 | Wallace | ............... | H04B 1/0003 455/552.1 |
| 2005/0250468 A1* | 11/2005 | Lu | .................. | H04L 12/2854 455/403 |
| 2006/0282497 A1* | 12/2006 | Braun | ................ | H04L 63/0823 709/203 |
| 2007/0105587 A1* | 5/2007 | Lu | .................. | H04B 1/0003 455/552.1 |
| 2008/0137548 A1* | 6/2008 | Hassan | ................ | H04W 28/18 370/252 |
| 2009/0170444 A1* | 7/2009 | Retnasothie | ......... | H04B 1/0039 455/73 |
| 2012/0252387 A1* | 10/2012 | Haskins | ............... | H04B 1/0014 455/131 |
| 2013/0235798 A1* | 9/2013 | Choi | ................... | H04B 1/0003 370/328 |
| 2015/0178112 A1* | 6/2015 | Ivanov | ............... | G06F 9/45504 718/1 |
| 2015/0207680 A1* | 7/2015 | Ivanov | .................... | H04B 1/40 455/73 |
| 2015/0244400 A1* | 8/2015 | Mueck | ................ | H04B 1/0057 455/77 |

OTHER PUBLICATIONS

Yeong Su Yuk et al., "Technology and Trends on SDR-based Terminal," The Proceedings of the Korean Institute of Electromagnetic and Engineering and Science, Oct. 2007, pp. 38-51, vol. 18, No. 4.

International Search Report of PCT/KR2015/008665 dated Nov. 16, 2015.

* cited by examiner

METHOD AND TERMINAL DEVICE FOR EXECUTING RADIO APPLICATION

TECHNICAL FIELD

The present invention relates to methods for a terminal device to execute a radio application and the terminal device in a technology domain related to software-defined radio (SDR), digital wireless communications, radio processor (RP), application processor (AP), or multi-radio application. Especially, the present invention relates to a reconfigurable radio frequency interface (RRFI) for controlling the radio application (RA), and more particularly to a structure of the terminal device including the RRFI for controlling execution of the radio application independently on hardware, and methods for executing the radio application using the RRFI.

BACKGROUND ART

As communication technology advances, various new kinds of radio applications are being used as adapted for tastes and objectives of users. The most of radio applications, such as a Long Term Evolution (LTE), a Wide-band Code Division Multiple Access (WCDMA), a Worldwide Interoperability for Microwave Access (WiMAX), a Global System for Mobile Communications (GSM), may operate on radio terminals by interworking with a modem embedded in the radio terminal.

In order to make it possible that a radio application controls the modem, a customized module should be developed based on understanding unique instructions of each modem designed by various modem manufactures or having various models. This situation leads to a result that a specific application can be executed on a specific modem designed by a specific manufacturer, or even on a specific model of modem designed by the specific manufacturer. To overcome the above-mentioned problem, different control instruction codes customized for various kinds of modems should be comprised in the radio application, or different executable file for each modem should be built and distributed.

However, since it is practically impossible to optimize the radio application to all the various kinds of modem hardware currently available in the market currently by the above-mentioned methods, there is a problem that a great manpower is needed to develop a radio application.

In order to resolve the above-described problems, there were attempts to produce hardware-independent multi radio applications by using unified instruction sets instead of instruction sets unique for respective manufacturers.

Also, a technology which can convert a manner in which each of a radio base station and a terminal apparatus supports radio frequency (RF) through hardware into a manner in which each of the radio base station and the terminal apparatus supports RF through software. That is, a software defined radio (SDR) technology can make it possible that a single apparatus can support multiple modes, multiples bands, and multiple environments without being restricted to a specific location or time.

If a SDR module is installed in a portable terminal such as a mobile phone, a personal digital assistant (PDA), and a laptop computer, the SDR module can make it possible that the terminal supports different frequency bands and two or more systems. That is, the SDR technology can provide a new communication manner for various wireless networks, various wireless communication systems, various frequency bands, and high-speed data communications in a fourth generation communication pursuing an all internet protocol (All-IP) based wireless multimedia communications.

In connection with the software defined radio (SDR) technology, there exists a software communication architecture (SCA) which is a defacto standard technology. It may comprise specifications related to frameworks for SDR, middleware, and real-time operating system (OS), which guarantees compatibility of interfaces between SDR systems. The core of SCA is a core framework which is a framework specification. In the core framework, various parts constituting radio applications are componentized and the components may be reused and assembled so as to create a new radio application.

In case of SCA, it is possible to make rearrangement of blocks which are already installed in a terminal. However, user-defined blocks to be used for a specific radio application cannot be installed even into SCA compatible terminals having different hardware configurations. Thus, single executable codes cannot be used for all SCA compatible terminals.

This means that executable codes optimized for each hardware configuration on which each SCA compatible terminal is based should be respectively created and distributed. This demands very much time and cost, and makes commercial uses of radio applications difficult, Also, it does not provide baseband application programming interface (API) for implementation of radio applications, and accordingly it makes selective utilization of hardware acceleration functions difficult.

DISCLOSURE

Technical Problem

The purpose of the present invention for resolving the above-described problems is to provide a terminal device for executing a radio application which is independent on hardware.

Also, the purpose of the present invention is to provide a method of functionally separating various components operating in a processor of the terminal device, and making it possible that various components can interwork.

Technical Solution

In an aspect of the present invention to achieve the above-described objective, a method for executing a radio application independent of a modem, performed in a terminal device, may be provided. The method may comprise communicating with each other using a reconfigurable radio frequency interface (RRFI) by a unified radio application (URA), which operates on a radio computer of the terminal device, and a radio frequency (RF) transceiver, which operates in a radio platform on the radio computer; and supporting, by the RRFI, at least one service among a spectrum control service, a power control service, an antenna management service, a transmission/reception chain control service, and a radio virtual machine (RVM) protection service.

Here, the at least one service supported by the RRFI may be different according to a reconfiguration class of the terminal device.

Here, the RRFI may be used in parallel with or complementarily to other radio frequency interface defining physical interconnections between a baseband processing part and a RF integrated circuit of the terminal device.

Here, the RRFI may provide a first interface for configuration of the RF transceiver, and the first interface may allow at least one of the URA and the RF transceiver to change control information and data between the URA and the RF transceiver according to a radio spectrum environment.

Also, the RRFI may provide a seventh interface for unified representation of control information, and the seventh interface may allow control information through a RF front-end connected to the RF transceiver to be represented in a unified format for handling of the RF front-end.

Also, the RRFI may provide an eighth interface for unified representation of a data payload, and the eighth interface may allow the data payload passing through a RF front-end connected to the RF transceiver to be represented in a unified format for data handling of the RF front-end.

Also, the RRFI may provide a ninth interface for selection of a RF protection class which is introduced for tradeoffs between an effort for certification or re-certification and flexibility of a RF front-end connected to the RF transceiver, and the flexibility of the RF front-end may include band selection, bandwidth selection, limitation on out-of-band (OOB) emission, or a combination of them.

Here, the RRFI may provide a second interface for extension of a multi-antenna system, and the second interface may allow the URA to select a number of physical input antennas or physical output antennas according to radio environments.

Here, the RRFI may provide a third interface for capability of multiple frequency bands, and the third interface may support a plurality of radio applications using different frequency bands.

Here, the RRFI may provide a fourth interface for reconfiguration of the RF transceiver, and the fourth interface may allow the RF transceiver to manage at least one output signal or received signal from at least one radio application or to the URA.

Here, the RRFI may provide a fifth interface for interworking of radio resources, and the fifth interface may support a plurality of radio applications to share the radio resources.

Here, the RRFI may provide a sixth interface for testing radio equipment, the sixth interface may support a test mode having a capability of testing a RF path without emission of radio waves, and the test mode includes a loop-back mode in which a transmission chain connected to the RF transceiver is connected to a reception chain.

Here, the RRFI may be based on an extension of classes of the radio computer, the classes of the radio computer may include RCMeasurements class, RCConfiguration class and subclasses thereof, Channel class and subclasses thereof, and RCCapabilities class.

Also, the RRFI may connect a RVM software component and a baseband implementation integrated circuit of a baseband processing part of the terminal device with a chain of the RF transceiver or a RF front-end In another aspect of the present invention to achieve the above-described objective, a terminal device for executing a radio application independent of a modem may be provided. The terminal device may comprise a unified radio application (URA) operating in a radio computer of the terminal device; a radio frequency (RF) transceiver operating in a radio platform of the radio computer; and a reconfigurable radio frequency interface (RRFI) connecting the URA and the RF transceiver, and supporting at least one service among a spectrum control service, a power control service, an antenna management service, a transmission/reception chain control service, and a radio virtual machine (RVM) protection service.

Here, the at least one service supported by the RRFI may be different according to a reconfiguration class of the terminal device.

Here, the RRFI may be used in parallel with or complementarily to other radio frequency interface defining physical interconnections between a baseband processing part and a RF integrated circuit of the terminal device.

Also, the terminal device may further comprise the baseband processing part including a RVM software component selecting a radio frequency and a RVM protection class, and a baseband implementation integrated circuit, and a RF front-end chain or a RF transceiver chain connected with the baseband processing part via a digital interface, wherein the RVM software component and the baseband implementation integrated circuit may communicate with the RF front-end chain or the RF transceiver chain via the RRFI.

Here, the spectrum control service may include configuration of a center frequency, configuration of a bandwidth, and configuration of a sampling rate.

Here, the RRFI may include a first interface for the spectrum control service, the URA may transmit, via the first interface, to the RF transceiver a message for requesting configuration of a center frequency, a bandwidth, or a sampling rate, and the RF transceiver may transmit, via the first interface, to the URA a message for confirming the configuration of the center frequency, the bandwidth, or the sampling rate, or indicating a failure of the configuration of the center frequency, the bandwidth, or the sampling rate.

Advantageous Effects

Using the above-described method for executing the radio application and the terminal device according to the present invention, it is made possible that various radio applications can be used independently of hardware platforms of terminal devices.

In addition, in aspect of mobile operators, it may become possible to switch radio access technologies of which terminals based on various radio platforms that subscribers are using into desired radio access technologies according to their needs so that flexible operation of mobile networks may be possible.

In addition, in aspect of subscribers, it may become possible that they can use new radio access technologies only by downing a radio application package for a desired radio application and installing the desired radio application in their terminals without purchasing new terminals.

BEST MODE

Figure 1:
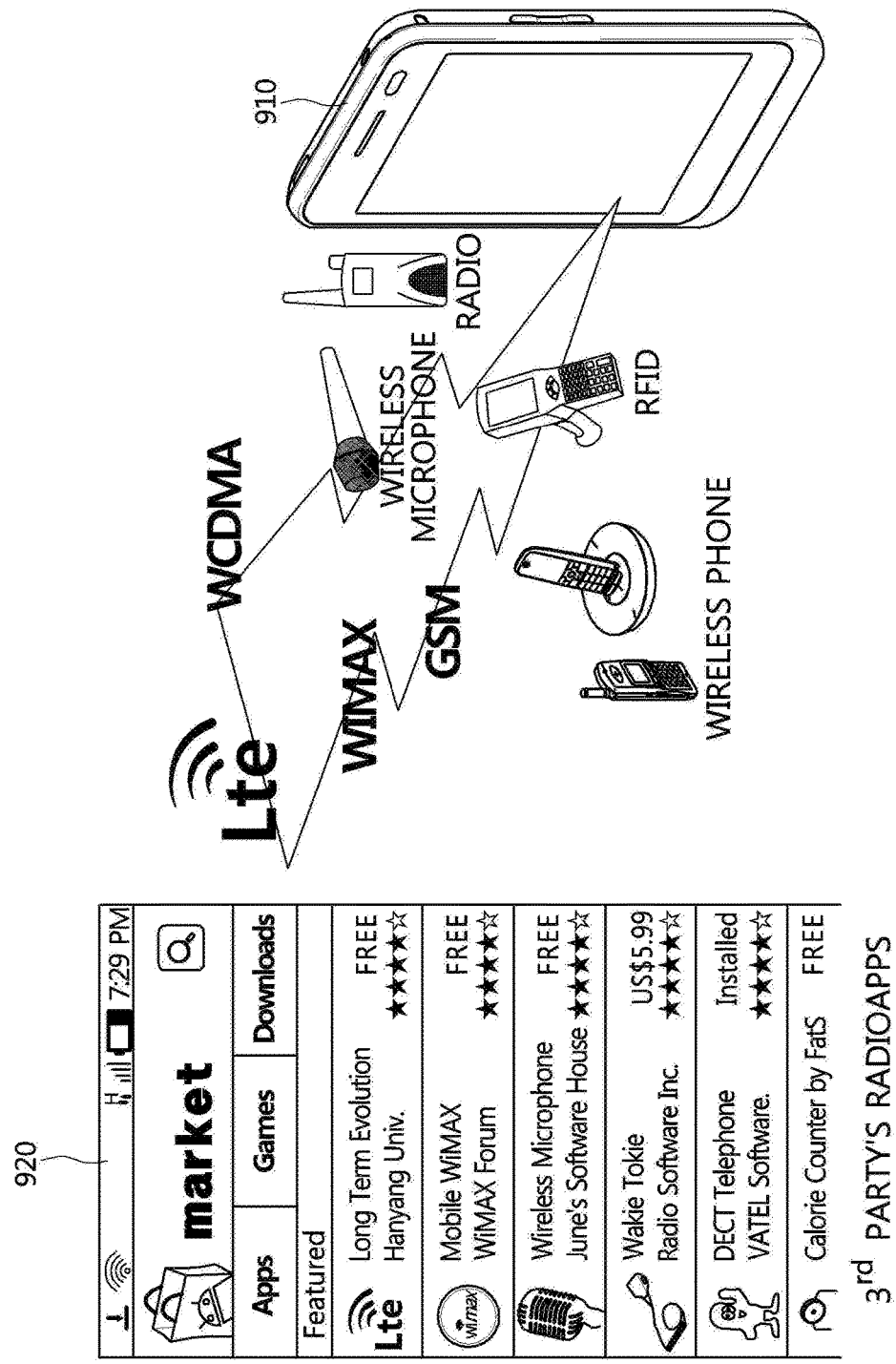
FIG. 1 is a conceptual diagram showing an example in which a terminal device according to an embodiment of the present invention downloads a radio application package distributed by an online application store.

The present invention may be variously modified and may include various embodiments. However, particular embodiments are exemplarily illustrated in the drawings and will be described in detail. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout the description of the drawings.

Relational terms such as first, second, A, B, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is not for delimiting the present invention but for describing the specific embodiments. The terms of a singular form may include plural forms unless otherwise specified. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Terminologies used for explaining the present invention are defined as follows. Other terminologies except the following terminologies will be defined in the corresponding part of the present specification.

Radio Application (RA): an application which provides a radio communication environment independent on specific hardware configurations and user applications. The radio application may be executed on a radio processor. Alternatively, the radio application may be configured to comprise a part which is executed on a radio processor and a part which is executed on an application processor, and to operate on the two processors. The radio application may comprise a radio controller and function blocks. The function blocks may include standard function blocks and user defined function blocks.

Radio Application Package (RAP): As a distribution form of a radio application, a RAP may include a radio controller and function blocks which are components of the radio application, and also include pipeline configuration metadata. In addition, the radio application package may further include a radio library.

Standard Function Block (SFB): It is a standardized function block each of which has a standardized function and a standardized function name used for calling the function. In case that radio platform chip vendors develop the standard function blocks, the standard function blocks may be a set of function blocks implemented by the vendors, and may be provided with a driver used for driving the blocks. The standard function blocks may be implemented by using a dedicated hardware accelerator, or implemented as executable codes to be executed on a radio processor core. If the standard function blocks are implemented as executable codes to be executed on a radio processor core, a set of the standard function blocks may be referred to as a radio library. Each of the standard function blocks has standardized name and feature for its function, and may be defined by using a standard baseband Application Programming Interface (API) header.

User-Defined Function Block (UDFB): It is a function block which can be provided by radio application providers. A UDF may have a function which is not provided as a standard function block or a function which is customized from an existing standard function block. It may be implemented to be executed on a radio processor core. The user-defined function blocks may be provided in forms of executable codes, source codes, or intermediate representation (IR) codes.

User Defined Function Block (UDFB) set: A set of user-defined function blocks which are provided by radio application providers.

Radio Hardware Abstract Layer (HAL): It is a layer abstracting various kinds of hardware in aspect of an operating system (OS). Since standardized abstract interfaces of accelerator are independent on hardware, HAL enables OS to access all types of hardware. A role of HAL is similar to a role of driver. However, HAL is included in OS differently from drivers which may change according to hardware changes.

Radio Platform Driver: It is software needed for OS to recognize hardware. This is software matching OS instructions which are independent on hardware with hardware-instructions, and may act as a usual hardware driver.

Radio Platform: It may be a part of mobile device hardware related to RF functions, such as fixed and/or programmable hardware accelerator, RF transceiver, and antenna. That is, the radio platform may be a part of hardware which can generate or receive RF signals. Basically, the radio platform may be heterogeneous hardware including different processing elements such as fixed accelerators (for example, application-specific integrated circuit (ASIC)) or reconfigurable accelerators (for example, FPGA).

Radio Computer: It may be a combination of a radio processor (RP) and a radio platform in a reconfigurable mobile device. In a mobile device, individual radio application may be designed as software elements executable on a radio processor which can be considered as a general-purpose computing element.

Hereinafter, exemplary embodiments of the present invention will be described in detail with reference to the accompanying drawings. In describing the invention, to facilitate the entire understanding of the invention, like numbers refer to like elements throughout the description of the figures, and a repetitive description on the same element is not provided.

FIG. 1 is a conceptual diagram showing an example in which a terminal device according to an embodiment of the present invention downloads a radio application package distributed by an online application store.

Referring to FIG. 1, a terminal device according to an embodiment of the present invention may download a radio application and install it in various wireless communication network environments. That is, a user may access an on-line application store 20 via a terminal device 10, select a desired radio application in a list of radio applications provided by the on-line application store, which support various radio access technologies, and download a radio application package corresponding to the selected radio application.

The various radio access technologies may include Long Term Evolution (LTE), Wideband Code Division Multiple Access (WCDMA), Worldwide Interoperability for Microwave Access (WiMax), Global System for Mobile Communications (GSM), Radio-Frequency Identification (RFID), and so on. The user may freely select a radio application to be used situationally among a plurality of radio applications which have been downloaded and installed in the terminal.

Composition and Software Architecture of a Radio Application

Figure 2:
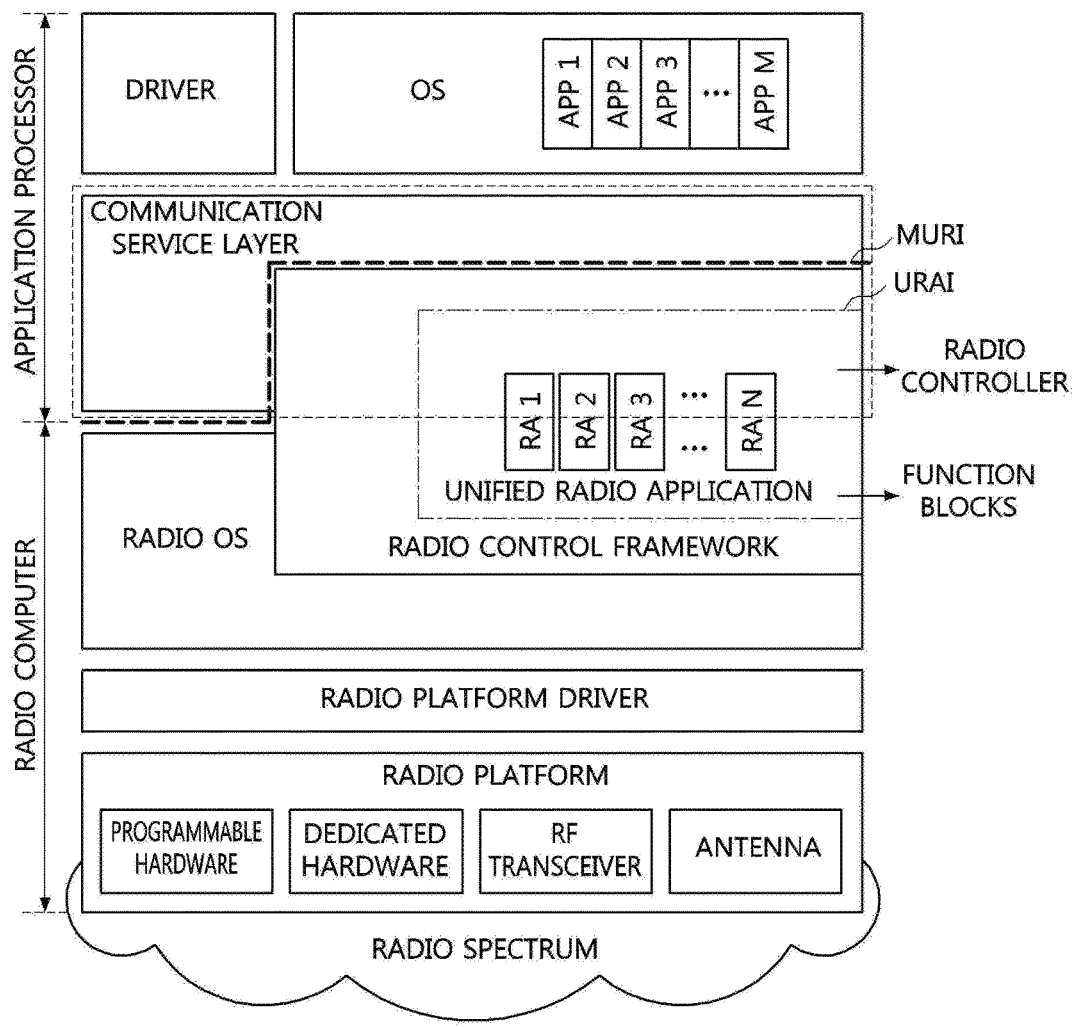
FIG. 2 is a block diagram explaining software architecture of a terminal device according to an embodiment of the present invention.

FIG. 2 is a block diagram explaining software architecture of a terminal device according to an embodiment of the present invention.

Referring to FIG. 2, a radio software architecture of a terminal device according to the present invention may comprise an AP layer which operates on an application processor (AP) and a RP layer which operates on a radio processor (RP). Here, the RP may be also referred to as a baseband processor (BP). The combination of the RP and the radio platform may be referred to as the radio computer.

FIG. 2 illustrates a software architecture environment where a RCF, which is described later, is divided into two parts—a part being executed on the AP (referred to as an AP layer part) and a part being executed on the RP (referred to as a RP layer part), and executed on the two processors. Of course, the RCF may be implemented to operate on the RP and a radio operating system.

A non-real time OS such as Andriod OS of Google, iOS of Apple, etc. may operate on the AP, and a real time OS (hereinafter, referred to as a 'radio OS') may operate on the RP. Hereinafter, for clear discrimination, the non-real time OS operating on the AP layer may be referred to as 'OS', and the real time OS operating on the RP layer may be referred to as 'radio OS'.

Hereinafter, the AP layer, the RP layer, and components constituting the RCF will be described in detail.

Application Processor Layer

The AP layer comprises, as shown in FIG. 2, the following components such as drivers, an OS, and a communication service layer (CSL).

Drivers may drive hardware devices on a given OS. The hardware devices may include a camera, a speaker, etc.

OS may be a non-real time OS such as Android and iOS operating in general mobile devices. If the RCF is configured to operate on the AP and the RP both, an AP layer part of the RCF may exist on the OS.

The CSL may provide at least some of the following three services to the RCF.

The first service is related to an administrative. It may be a service related to installation/uninstallation of radio applications, creating/deleting instance of radio applications, and acquisition of a list of radio applications in each status (installed, instanced, activated).

The second service is related to connection control. It may be a service related to activation/deactivation of radio applications, creation of data flow, creation of network allocation, and acquisition of a list of radio applications in each status (installed, instanced, activated).

The third service is related to data flow. That is, this service is a service related to sending/receiving user data.

As an example of CSL configurations for providing at least some of the above-described three services, the CSL may be configured to comprise an administrator application, a mobility policy manager application, a networking stack, and a monitor application. The networking stack may comprise a protocol stack operating in the CSL.

Meanwhile, the CSL may comprise only some of the above-described components, and may further comprise additional components as well as the above-described components. Also, one or more components among the above components may be integrated into a single component existing within the CSL. Also, the above-described components are only examples of components which the CSL can comprise in order to support services which should be performed by the CSL. That is, the CSL may be defined based on functions performed by it. The above-described exemplary composition of components does not restrict composition of the CSL.

In the configuration in which the RCF operates on both the AP and the RP, radio applications, which become targets of distribution, installation, and execution of the terminal device according to the present embodiment, may respectively comprise AP layer parts and RP layer parts. A radio controller (RC) which is the AP layer part of each radio application may be configured to transmit context information to the monitor application of the CSL, transmit data to the networking stack of the CSL, and receive data from the networking stack.

Radio Processor Layer

The RP layer may comprise, as shown in FIG. 2, the following components such as a radio OS, radio platform drivers, etc.

A radio OS 121 is a real time operation system. If the RCF is configured to operate on both of the AP and the RP, a RP layer part of the RCF may exist on the radio OS.

Radio platform drivers may be components demanded for the radio OS to recognize a hardware radio platform similarly to usual hardware drivers.

If the RCF operates only on the RP (refer to FIG. 3), radio applications, which become targets of distribution, installation, and execution of the terminal device according to the present embodiment, may operate on the RP layer.

Radio controllers (RCs) of respective radio applications may be configured to transmit context information to the monitor application of the CSL, transmit data to the networking stack of the CSL, and receive data from the networking stack.

The above-described RP may constitute a radio computer together with the radio platform or the radio platform hardware. Here, the radio platform hardware may be configured as programmable hardware of the RP and baseband accelerators. The baseband accelerators prepared for the standard function block(s) may usually be provided in form of application-specific integrated circuit (ASIC). Also, the radio platform may include at least one RF transceiver and at least one antenna.

A multi-radio interface (MURI) is used as an interface between the above-described CSL and the RCF, and a unified radio application interface (URAI) is used as an interface between the radio application and the RCF. Also, a reconfigurable radio frequency interface (RRFI) is used as an interface between a radio application and the RF transceiver.

A radio application is an application enabling communications of a mobile terminal, and may be distributed in form of a radio application package (RAP). The RAP may comprise components such as function blocks (FBs), pipeline configuration metadata, radio controller code (RC code), and radio library.

The radio library may be distributed in form of executable codes as included in a RAP, in a case that the standard function blocks (SFB) are distributed as executable codes. The RAP may be downloaded onto the OS of the AP layer, and the user-defined function block codes and the radio library may be loaded from the AP to the RP by referring to the pipeline configuration metadata, and finally loaded to the radio OS on the RP layer.

Radio Control Framework

The radio control framework (RCF) is a component for providing operation environment of radio applications.

If the RCF is configured to operate on both the AP and the RP, components of the RCF may be classified into two groups. That is, one group operates on the AP, and other group operates on the RP. Which components of the RCF operate on the RP (i.e. in real-time) and which components of the RCF operate on the RP (i.e. in non-real-time) may be determined differently by each vendor.

Basically, the RCF may include at least some of the following 5 components for managing radio applications.

However, the RCF may comprise only some of the following 5 components, and may further comprise additional components as well as the following 5 components. Also, one or more components among the following components may be integrated into a single component existing within the RCF.

The function and role of the RCF may be defined based on functions performed by the components which will be described. The following exemplary components do not restrict composition of the RCF. That is, the RCF may have various configurations for performing at least some of functions of the following components.

1) Configuration Manager (CM): Installation/uninstallation and creating/deleting instance of RAs for a multi radio terminal apparatus as well as access management of radio parameters for RAs.

2) Radio Connection Manager (RCM): Activation/deactivation of RAs according to user requests, and overall management of user data flows, which can also be switched from one RA to another.

3) Flow Controller (FC): Sending and receiving of user data packets and controlling the flow of signaling packets.

4) Multiradio Controller (MRC): Scheduling the requests for radio resources issued by concurrently executing RAs and detecting and managing the interoperability problems among the concurrently executing RAs.

5) Resource Manager (RM): Managing multi-radio resources to share them among simultaneously active RAs, and to guarantee their real-time requirements.

Software Architecture of RRFI

Figure 3:
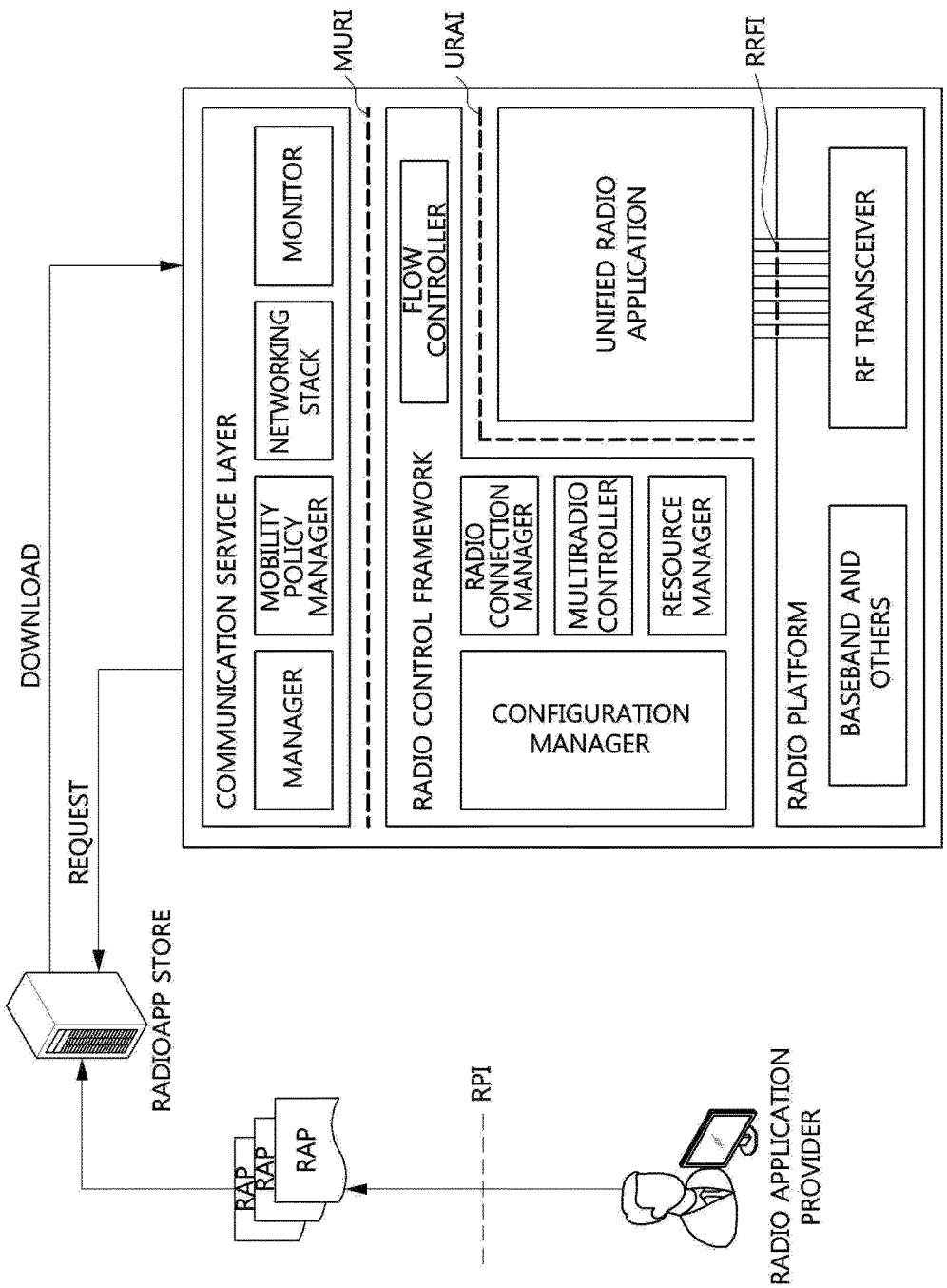
FIG. 3 is a conceptual diagram explaining four interfaces related to a terminal device in an environment of a reconfigurable terminal device according to an embodiment of the present invention.

FIG. 3 is a conceptual diagram explaining four interfaces related to a terminal device in a usage environment of a reconfigurable terminal device according to an embodiment of the present invention.

Referring to FIG. 3, a reconfigurable terminal device according to an embodiment of the present invention may be capable of running multiple radios simultaneously and of changing the set of radios by loading new RAPs. All Radio Applications (RAs) may be called as Unified Radio Applications (URAs) when they exhibit a common behavior from aspect of radio reconfiguration of the terminal device.

In order to run multiple URAs, the reconfigurable terminal device (hereinafter, referred to simply as 'terminal device') may include the CSL, RCF, radio platform and 4 sets of interfaces for their interconnection.

The four interfaces related to the reconfigurable terminal device according to an embodiment of the present invention may include a Multi Radio Interface (MURI) which is an interface between respective components of the CSL and RCF, a Reconfigurable Radio Frequency Interface (RRFI) which is an interface between a URA and a RF transceiver, a Unified Radio Application Interface (URAI) which is an interface between an URA and respective components of the RCF, and a Radio Programming Interface (RPI) which is an interface allowing an independent and uniform production of RAs.

The RRFI is an interface defined between a URA and a RF transceiver, that is, an interface between a URA and radio spectrums.

Figure 4:
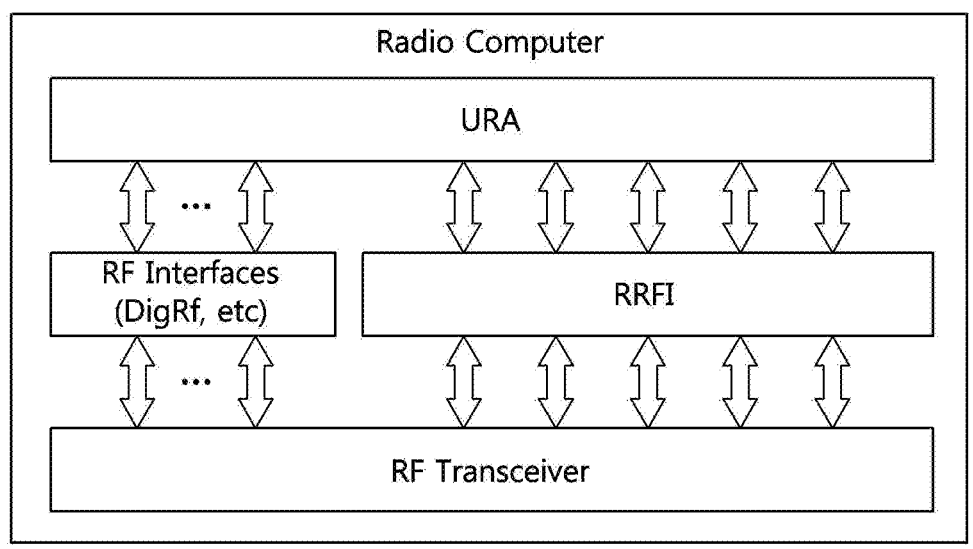
FIG. 4 is a conceptual diagram illustrating how a URA and a RF transceiver interwork with each other by using RRFI in a reconfigurable terminal device according to an embodiment of the present invention.
Figure 5:
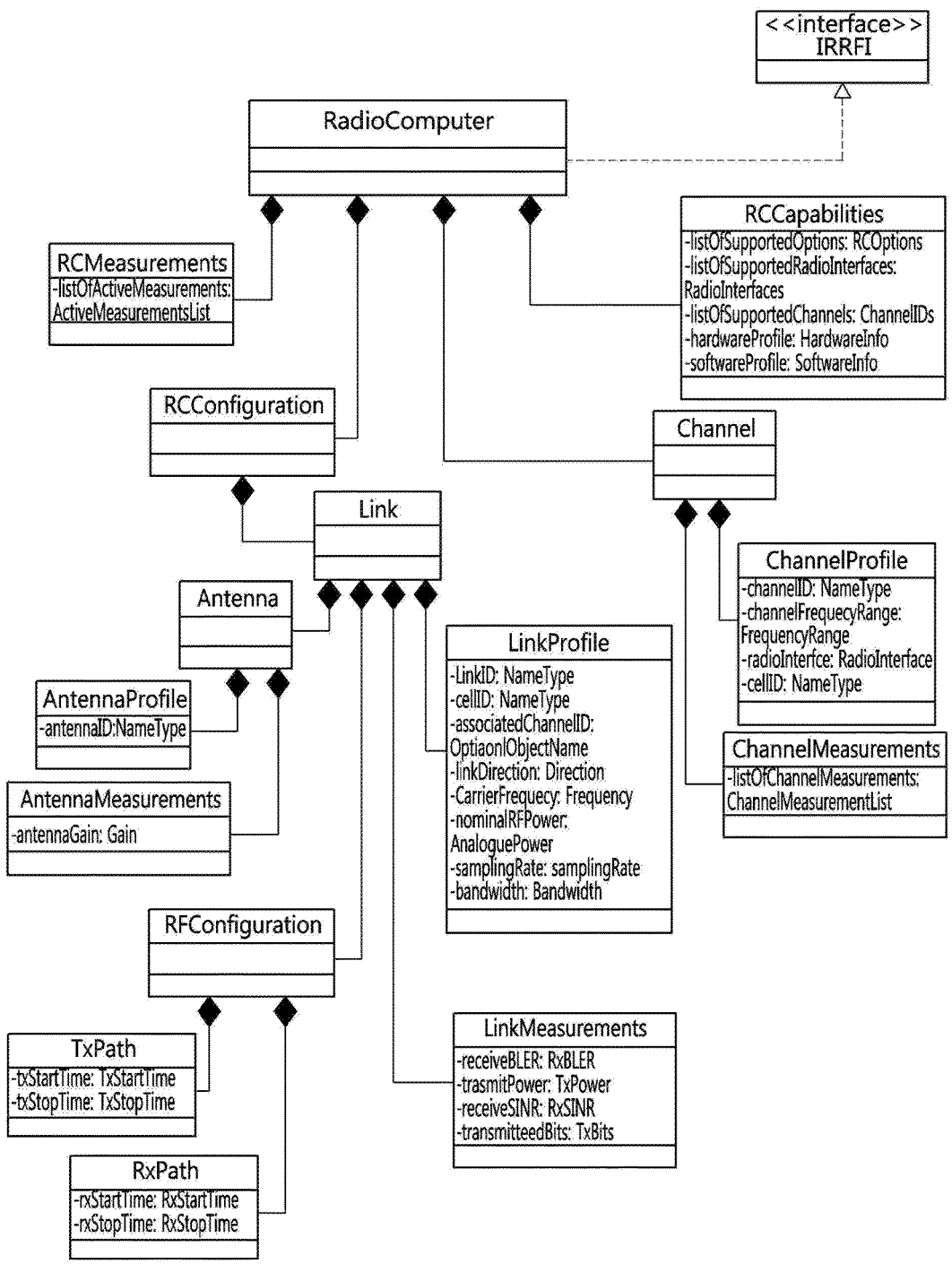
FIG. 5 is a unified modeling language (UML) diagram illustrating elements of RRFI in a terminal device of FIG. 4.

FIG. 4 is a conceptual diagram illustrating how a URA and a RF transceiver interwork with each other by using RRFI in a reconfigurable terminal device according to an embodiment of the present invention. FIG. 5 is a unified modeling language (UML) diagram illustrating elements of RRFI in a terminal device of FIG. 4.

As shown in FIG. 4 and FIG. 5, the RRFI may support one or more of following five services. The five services may include spectrum control services, power control services, antenna management services, Tx/Rx chain control services, and a radio virtual machine (RVM) protection services.

The spectrum control services may be used to set up spectrum-related parameters of a RF transceiver system. Various radio applications may have their unique spectrum parameters. The spectrum-related parameters may include center frequency, bandwidth, sampling rate, handover parameter configuration and so on.

For the spectrum control services, the RRFI may provide a first interface. In this case, the URA may transmit, through the first interface, to the RF transceiver a message requesting to configure the center frequency, bandwidth, or sampling rate. Also, the RF transceiver may transmit, through the first interface, to the URA a message for confirming configuration of the center frequency, bandwidth, or sampling rate, or a message for indicating a failure of the configuration of the center frequency, bandwidth, or sampling rate.

The power control services may be used to set up power-related parameters of a RF transceiver system. For example, the power-related parameters may include maximum Tx power level, Tx power per antenna, receive sensitivity level, Tx/Rx gain, Rx gain, Monitoring of Tx power level and so on. Also, the power control services may support setting of specific power schemes. Here, the specific power schemes may include day, night, event, power saving, etc.

For the power control services, the RRFI may provide a second interface. In this case, the URA may transmit, through the second interface, to the RF transceiver a message requesting to configure the maximum Tx power level, Tx power per antenna, or Rx chain gain, or to measure Tx power level of an activated radio application. Also, the RF transceiver may transmit, through the second interface, to the URA a message for confirming configuration of the maximum Tx power level, Tx power per antenna, or Rx chain gain, or a message for indicating a failure of the configuration of the maximum Tx power level, Tx power per antenna, or Rx chain gain. Also, the second interface is used for the RF transceiver to transmit to the URA information related to the measurement of Tx power level of the activated radio application.

The antenna management services may be used to provide services related to antenna port selection of a RF transceiver system, and services related to RF radiation patterns. For example, antenna radiation pattern, antenna gain, antenna direction, sector configuration (e.g., 3×1, 1×1, etc.), physical antenna type (e.g., multi-pad, MIMO, SIMO, MISO, SISO, etc.), etc. may be factors to be considered in the antenna management services.

For the antenna management services, the RRFI may provide a third interface. In this case, the URA may transmit, through the third interface, to the RF transceiver a message for indicating selection of Tx antenna port or Rx antenna port. Also, the RF transceiver may transmit, through the third interface, to the URA a message for confirming the selection of Tx antenna port or Rx antenna port, or a message for indicating a failure of the selection of Tx antenna port or Rx antenna port.

The Tx/Rx chain control services may be used to provide parameters related to real-time control of the RF transceiver chain. For example, the parameters to be controlled using the Tx/Rx chain control services may include Tx start/stop time, Rx start/stop time, update of Tx/Rx chain parameters and so on. Also, the Tx/Rx chain control services may be used to transfer baseband signals generated by the URA to the RF transceiver, and control variable spectrum-related setting values and/or variable power-related setting values in real-time during actual communications.

For the Tx/Rx chain control services, the RRFI may provide a fourth interface. In this case, the URA may transmit, through the fourth interface, to the RF transceiver a message requesting to configure the Tx start time, Tx stop time, Rx start time, or Rx stop time, or a message to update the Tx/Rx chain parameters. Also, the RF transceiver may transmit, through the fourth interface, to the URA a message for confirming the configuration of the Tx start time, Tx stop time, Rx start time, or Rx stop time, or the update of the Tx/Rx chain parameters, or a message for indicating a failure of the configuration of the Tx start time, Tx stop time, Rx start time, or Rx stop time, or the update of the Tx/Rx chain parameters.

The RVM protection services may provide a service used for the RF transceiver system to select a RVM protection class. For example, parameters to be controlled using the RVM protection services may include selection and/or request of RVM RF protection class, RF Front-end indication of input data signals modification, etc. The RVM protection services will be described in further detail.

RVM Protection Services

Interfaces or messages related to services in the RVM protection services of the RRFI may be described as follows. As a part of RRFI features, the RVM protection services may include services such as selection of RF protection class, request of RF protection class status, request for change of RF protection classes, RF front-end indication of modification of input data signals, RF front-end emergency switch off, and information on cross radio access technology interference.

Selection of RF protection class: In the context of software reconfiguration, the RF front-end typically allows the selection of RF protection classes. The suitable protection class is typically provided with the software component and influences the level of required re-certification (leading to the final declaration of conformity) of the concerned terminal device. The selection request for a specific RF Protection class is typically followed by an acknowledgement message (ACK) issued by the RF Front-End in case of successful operation, in case of unsuccessful operation a NACK (not acknowledgement) message is issued. In case that the RF front-end is not providing support for a specific requested protection class then the next higher protection class is selected which comprises the requested protection features plus possibly further ones. This is followed by the issuance of an ACKM (acknowledgement with modification) message. Possibly, details on the modified protection class selection may be given when a protection is requested. If the request for a protection class specifically indicates that no higher class may be selected (the more restrictive protection mechanisms may prevent the software components from operating correctly), then the next lower class is selected in case that the specific requested protection class is not available. This, however, possibly requires a more detailed re-certification process (declaration of conformity) since the lower protection class may lead to a less protected front-end and thus poses a higher risk to other users.

Request of RF protection class status: other components such as baseband and/or AP components may request information on the RF protection class status. Then, the RF front-end may provide information on which protection class mechanisms are activated, e.g. additional filters for limiting out-of-band (OOB) emissions and/or spurious emissions, limitation of maximum output power levels, etc.

Request of change of RF protection class: RF protection may be changed depending on the currently active Radio Access Technologies, e.g. when hard-wired WiFi is used no RF Protection Classes are required or they are deactivated. On the other hand, when a software-modified LTE is used, a specific RF protection class may be required. (for example, in order to reduce the required level of re-certification.) The change of the protection class may occur based on a specific external trigger to the RF front-end. For example, the RF-front end may be programmed such that RF protection classes are (re-)configured (into activated state or inactivated state) temporarily or conditionally as required, typically depending the input waveform-radio access technology (RAT) data.

RF front-end indication of modification of input data signals: in case that the RF front-end protection mechanisms selected by one of the upper processes need to alter the request for data transmission such as reduction of output power levels, cutting of out-band signal components, etc., a corresponding information to the outputs of the RF front-end may be provided as a message. This may be typically processed by the baseband and/or AP.

RF front-end emergency switch off: in case that the RF front-end protection mechanisms detect massive violations of the emission limitations (e.g., massive OOB/spurious emissions, etc.), the RF front-end may decide to switch off the concerned transmission. Meanwhile, other (simultaneous) transmissions may still continue to operate in case they meet the limitations).

Information on cross-RAT interference: when multiple RATs are transmitted or received simultaneously, it is possible that the various RATs interfere with each other. If such interferences are detected in the RF front-end, the RF front-end may provide corresponding information to the URA, radio OS. RCF, or radio computer via the RRFI.

Class Definitions for Interface Each interface class related to RRFI may be defined using the template presented in the following tables 1 to 3, and the UML diagram of FIG. 5 which specifies the interface classes related to RRFI. The below tables 1 to 3 may specify operations related to interface classes for three services among the above-described five services.

TABLE 1

| Class SpectrumControlServices |
|---|
| This class describes interfaces supporting Spectrum Control Services<br>OPERATIONS |
| setTxCenterFrequency    Return type:    Value type:<br>                              BOOLEAN          public<br>This operation is needed for setting center frequency of Tx chain. |
| setTxBandwidth    Return type:    Value type:<br>                         BOOLEAN          public<br>This operation is needed for setting bandwidth of Tx chain. |
| setTxSamplingRate    Return type:    Value type:<br>                        BOOLEAN          public<br>This operation is needed for setting sampling rate of Tx chain. |
| setRxCenterFrequency    Return type:    Value type:<br>                              BOOLEAN          public<br>This operation is needed for setting center frequency of Rx chain. |
| setRxBandwidth    Return type:    Value type:<br>                       BOOLEAN          public<br>This operation is needed for setting bandwidth of Rx chain. |
| setRxSamplingRate    Return type:    Value type:<br>                        BOOLEAN          public<br>This operation is needed for setting sampling rate of Rx chain. |
| getTxChainParameters    Return type:    Value type:<br>                              TxChainParameters    public<br>This operation is needed for getting parameters of Tx chain. |
| getRxChainParameters    Return type:    Value type:<br>                              RxChainParameters    public<br>This operation is needed for getting parameters of Rx chain. |

TABLE 2

| Class RFFrontEndProtectionClassConfiguration<br>(or short name IRRF_Config) |
|---|
| This class describes interfaces for configuration of a RF protection class<br>OPERATIONS |
| SelectRFProtectionClass    Return type:    Value<br>                          Ack Type    type:<br>                          (typically    public<br>                          ACK, NACK,<br>                          ACKM)<br>This operation is related to the selection of an RF protection class. |
| RequestConditionalChangeOfProtectionClass    Return type:    Value<br>                          AckType    type:<br>                          (typically    public<br>                          ACK, NACK,<br>                          ACKM)<br>This operation is related to the (temporary/<br>conditional) change of an RF protection class |

TABLE 3

| Class RFFrontEndProtectionClassInformationService (or short name IRRF_IS) |
|---|
| This class describes interfaces supporting RF protection classes and related other components requesting RF protection related information |
| OPERATIONS |

| | | |
|---|---|---|
| RequestStatusRFProtectionClass | Return type: ProtectionStatusType | Value type: public |
| This operation is related to requesting/delivering information on the current status RF protection class (i.e., which protection mechanisms are currently activated for which configuration (e.g., for which RAT type), etc.). | | |
| RequestInformationOnDataModificationByRFProtection | Return type: RFProtectionInformationType | Value type: public |
| This operation is related to requesting/delivering information on how a RF protection class has modified incoming data prior to transmission in order to meet protection requirements | | |
| RequestInformationOnCrossRATInterference-ByRFProtection | Return type: RFProtectionInformationType | Value type: public |
| This operation is related to requesting/delivering information on how (how much) there is interference among (simultaneously transmitted/received) RATs due to operations of the currently active RF protection class. | | |
| ProvideInformationOnEmergencySwitchByRFProtection | Return type: ProtectionStatusType | Value type: public |
| This operation is related to requesting/delivering information on an eventual emergency switch off of the RF front-end due to massive violation of protection requirements | | |

At least one service of the above-described RRFI may be implemented in a terminal device according to a mobile device reconfiguration class (MDRC) of the terminal device. The reconfigurable terminal device may support RRFI services according to its MDRC as shown in the below table 4. In case that the reconfigurable terminal device supports multiple MDRCs, the corresponding reconfigurable terminal device may support all the services related to MDRC as defined in the below table 4.

Here, an URA may be defined as a part of a RP in a radio computer, which can generate baseband signals to be transmitted, and decode received baseband signals.

Also, a transceiver system with at least one transceiver chain and at least one antenna may be defined as a part of a radio platform in a radio computer, which can convert baseband signals into radio signals, and convert radio signals into baseband signals.

Also, a class may be a type of a template defining variables in a specific type of an object and methods for them. Therefore, the object may have actual values instead of the variables as an instance defined by the class. The class, as a concept defining object-oriented programming, may have a sub-class inheriting all or part of the characteristics of the class. In this case, the class may become a super class for each sub-class. The sub-class may define its own methods and variables, and a structure between the class and the sub-class may be defined as a class hierarchy. The methods may mean codes for performing specific operations similarly to functions, subroutines, routines, and procedures.

TABLE 4

| Mobile Device Reconfiguration Class | Spectrum Control services | Power Control services | Antenna Management services | Tx/Rx Chain Control services | RVM Protection services |
|---|---|---|---|---|---|
| MDRC-0 | No | No | No | No | No |
| MDRC-1 | Yes | Yes | No | No | Yes |
| MDRC-2, MDRC-5 | Yes | Yes | Yes | Yes | Yes |
| MDRC-3, MDRC-6 | Yes | Yes | Yes | Yes | Yes |
| MDRC-4, MDRC-7 | Yes | Yes | Yes | Yes | Yes |

In the table 4, MDRC-0 may denote a class of a mobile device which cannot be reconfigured, MDRC-1 may denote a class of a mobile device with fixed hardware which cannot share resources, MDRC-2 and MDRC-5 may denote classes of mobile devices having predefined fixed resources, MDRC-3 and MDRC-6 may denote classes of mobile devices having static resource conditions, and MDRC-4 and MDRC-7 may denote classes of mobile devices having dynamic resource conditions. Also, the MDRC-2, MDRC-3, and MDRC-4 may denote classes of mobile devices which can implement RRFI, etc. by downloading platform-specific executable codes, and the MDRC-5, MDRC-6, and MDRC-7 may denote classes of mobile devices which can implement RRFI, etc. by downloading platform-independent source codes.

Re-referring to FIG. 4, the radio computer may generate baseband signals to be transmitted in a Tx mode, and decode received baseband signals in a Rx mode.

More specifically, the URA may be defined as a part of a RP in a radio computer.

The RF transceiver may comprise at least one RF transceiver chain and at least one antenna. The RF transceiver may be a part of a radio platform in a radio computer. The radio platform may convert baseband signals into radio signals in the Tx mode, and convert radio signals into baseband signals in the Rx mode.

The RF interfaces may define physical interconnections between a baseband (e.g. modem) and a radio frequency integrated circuit (RFIC). For example, a wireless mobile RFIC may interwork with a baseband IC interface of the mobile device. The RF interface may be a complementary interface used in parallel with the RRFI.

The above-described entities, components, or units of the radio computer may be mapped to system requirements for the RF transceiver of the mobile device (i.e. the terminal device according to an embodiment of the present invention). The system requirements may include signals or messages related to configuration requests, commands, or requests enabling the RF transceiver to select RF configuration parameters.

The system requirements may include a first system requirement (R-FUNC-RFT-01) related to RF configuration, a second system requirement (R-FUNC-RFT-02) related to extendibility for multiple antenna system, a third system requirement (R-FUNC-RFT-03) related to capability of multiple frequency bands, a fourth system requirement (R-FUNC-RFT-04) related to reconfiguration of the RF transceiver, a fifth system requirement (R-FUNC-RFT-05) related to interoperability of radio resources, a sixth system requirement (R-FUNC-RFT-06) related to testability if radio equipment, a seventh system requirement (R-FUNC-RFT-07) related to unified representation of control information, an eighth system requirement (R-FUNC-RFT-08) related to unified representation of data payload, and a ninth system requirement (R-FUNC-RFT-09) related to selection of RF protection class.

The below table 5 shows an example of mapping of URA, RF transceiver, and RRFI, which are the above-described entities, components, or units of the radio computer, to system requirements. In the table 5, brief comments on functions of mapped system requirements are provided.

TABLE 5

| Entity/Component/Unit | System Requirements | Comments |
|---|---|---|
| Unified Radio Applications | R-FUNC-RFT-02 | Radio Application selects a suitable number of antenna inputs/outputs. |
| | R-FUNC-RFT-05 | Radio resources are shared between multiple Radio Applications |
| RF Transceiver | R-FUNC-RFT-03 | The reconfigurable mobile device supports multiple Radio Applications using distinct frequency bands. |
| | R-FUNC-RFT-04 | RF transceiver manages input/output signals from/to one or several Radio Applications. |
| | R-FUNC-RFT-06 | RF transceiver support a loop-back test mode |
| Reconfigurable RF Interface | R-FUNC-RFT-01, R-FUNC-RFT-07, R-FUNC-RFT-08 | The RRFI provides a suitable interface for RF transceiver configuration. |
| | R-FUNC-RFT-09 | The RRFI supports a suitable selection of an RF protection class. |

Interface Definition

Figure 6:
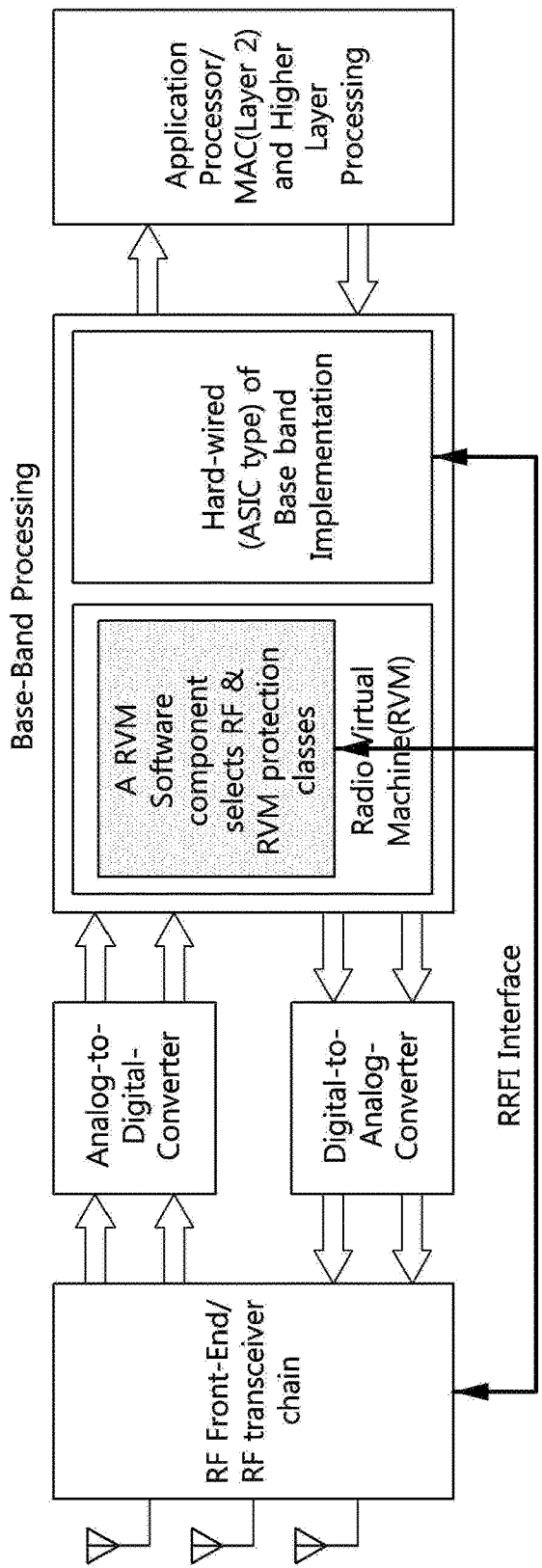
FIG. 6 is a block diagram illustrating architecture of a terminal device according to an embodiment of the present invention.

FIG. 6 is a block diagram illustrating an architecture of a terminal device according to an embodiment of the present invention.

Referring to FIG. 6, a terminal device according to an embodiment may comprise a radio virtual machine (RVM) and an application specific integrated circuit (ASIC) type baseband implement integrated circuit for baseband processing, a RF front-end chain, and a RF transceiver chain. The software component of the RVM may select RF and RVM protection class. Also, the baseband processing part may be connected to the AP or MAC (layer 2) and above layer processing part.

Also, the terminal device may comprise analog-digital converter and digital-analog converter between the RF front-end chain or the RF transceiver chain and the baseband processing part. Here, the analog-digital converter and digital-analog converter may be implemented based on conventional interface standards such as DigiRF, etc. which are not specified by the RRFI. The conventional interface standard may be referred to as 'other RF interfaces'. However, the RF front-end chain, RF transceiver chain, software component of the RVM, and the baseband implement integrated circuit may be interconnected to each other via RRFI according to the present invention.

Information Model for Radio Commuter

Figure 7:
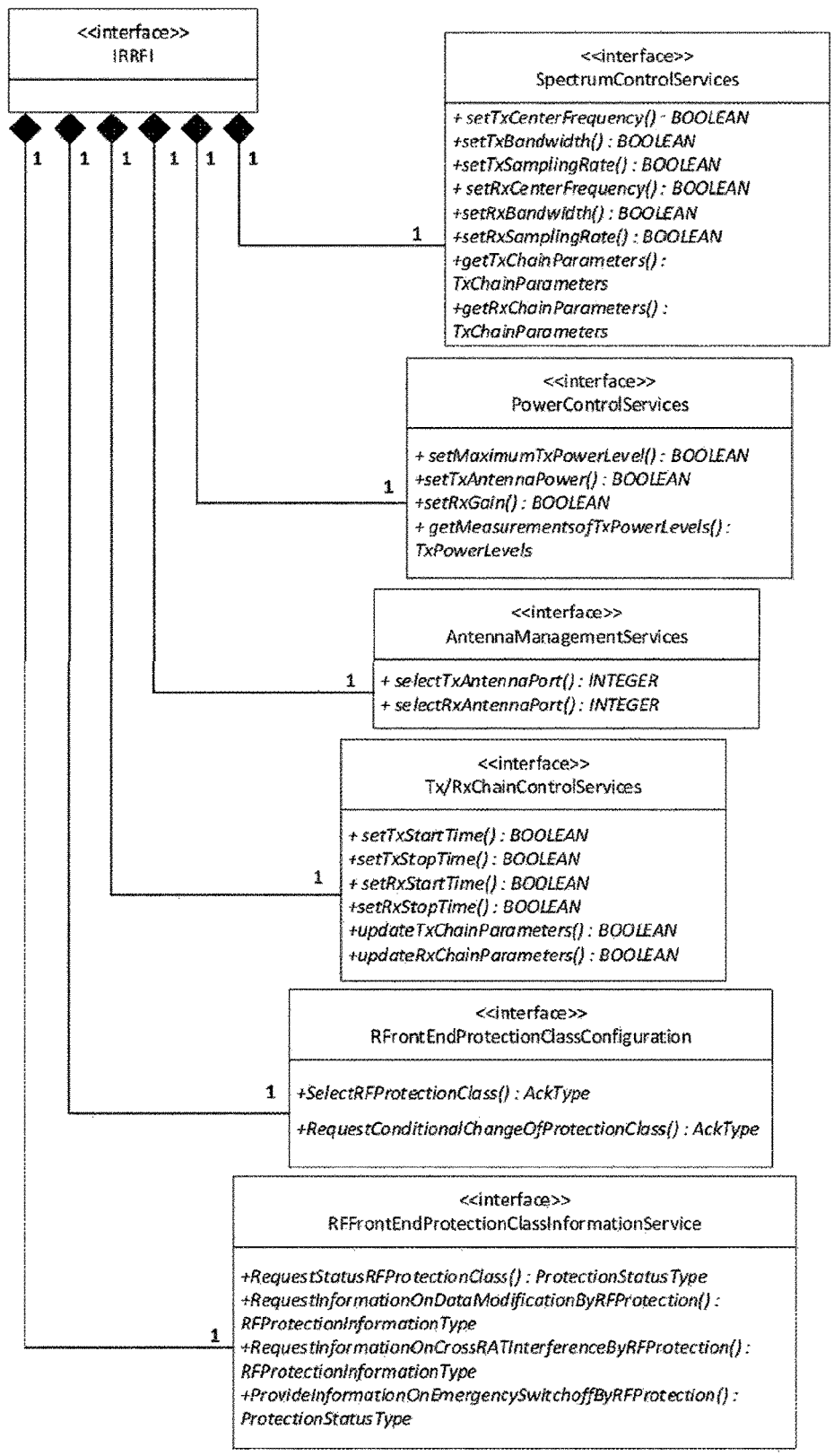
FIG. 7 is a UML diagram of a radio computer related to RRFI for a method for executing a radio application according to a mobile device according to another embodiment of the present invention.

FIG. 7 is a UML diagram of a radio computer related to RRFI for a method for executing a radio application according to a mobile device according to another embodiment of the present invention.

As illustrated in FIG. 7, radio computer classes related to RRFI may be summarized as follows.

RadioComputer class: This class describes all resources and interfaces related to hardware and software of a reconfigurable mobile device. For example, the RadioComputer class may include computational/spectral resource usage, collection of context information, channel measurement results, etc. The RadioComputer class may be associated with User class via IRRFI class.

RCCapabilities class: This class contains information about capabilities of the radio computer, including hardware, software, transmission and measurement capabilities such supported RATs and maximum transmission power. Each instance of RadioComputer class shall have only one instance of RCCapabilities class as a member.

Channel class: This class contains one radio channel that may or may not be used by an active radio link. Each instance of RadioComputer class can have zero, one or several instances of Channel class as members.

ChannelProfile class: This class contains general information about the radio channel such as channel ID, center frequency, bandwidth, and used radio interface. Each instance of Channel class shall have only one instance of Channel Profile class as a member.

ChannelMeasurements class: This class contains current measurements (instantaneous measurement data and performance statistics derived from this data) and the applied measurement configuration related to this radio channel such as interference and load measurements. Each instance of Channel class shall have only one instance of ChannelMeasurements class as a member.

RCConfiguration class: This class contains information about the current configuration of the radio Computer. Each instance of RadioComputer class shall have only one instance of RCConfiguration class as a member.

Link class: This class contains information about one active URA and the corresponding connection between the Reconfigurable mobile device and the Radio Access Network (RAN). Each instance of RCConfiguration class has zero, one or several instances of Link class as members. Each instance of Link class is associated with one instance of Channel class.

LinkProfile class: This class contains general information about this active connection, for example, link Identification (ID), serving cell ID, channel used, etc. Each instance of Link class shall have only one instance of LinkProfile class as a member.

LinkMeasurements class: This class contains current measurements (instantaneous measurement data and performance statistics derived from this data) related to this active connection, such as Block Error Rate (BLER), power, and Signal to Interference plus Noise Ratio (SINR) measurements. Each instance of Link class shall have only one instance of LinkMeasurements class as a member.

RFConfiguration class: This class contains information about the configuration of the RF transceiver. Each instance of Link class shall have only one instance of RFConfiguration class as a member.

TxPath class: This class contains information about one transmit path. Each instance of RFConfiguration class has zero or one instance of TxPath class as a member.

RxPath class: This class contains information about one receive path. Each instance of RFConfiguration class shall have only one instance of RxPath class as a member.

Antenna class: This class contains information about antenna selection. Each instance of Link class shall have at least one instance of Antenna class as a member. The antenna class may have AntennaProfile class and AntennaMeasurements class as its lower classes.

AntennaProfile class: This class contains general information about this antenna, such as antenna ID. Each instance of Antenna class shall have only one instance of AntennaProfile class as a member.

AntennaMeasurements class: This class contains information about current measurements related to an antenna, such as gain measurements (instantaneous measurement data and performance statistics derived from this data). Each instance of Antenna class shall have only one instance of AntennaMeasurements class as a member.

RCMeasurements class: This class contains current measurements (instantaneous measurement data and performance statistics derived from this data) related to reconfigurable mobile device such as battery capacity, user mobility, mobile device location determination, and connection history information. Each instance of RadioComputer class shall have only one instance of RCMeasurements class as a member.

Class Definitions for Information Model

The above-described classes of radio computer may be defined by using the UML diagram of FIG. 7 describing relations among all the classes of the radio computer and predetermined templates defined in the below tables 6 to 21. Also, the below tables 6 to 21 describe related operations of the radio computer classes.

TABLE 6

Class RadioComputer

This class contains all URA related information about resources and interactions related to hardware and software of a reconfigurable MD.

| DERIVED FROM | ATTRIBUTES |
|---|---|
| CONTAINED IN | |
| CONTAINS | RCCapabilities, RCConfiguration, RCMeasurements, Channel, RFConfiguration |
| SUPPORTED EVENTS | |

TABLE 7

Class RCCapabilities

This class contains information about Radio Computer capabilities including hardware, software, transmission and measurement capabilities.

| DERIVED FROM | ATTRIBUTES | | |
|---|---|---|---|
| listOfSupportedOptions | Value type: RCOptionsList | Possible access: Read-Write | Default value: Not specified |
| This attribute describes a list of supported options. | | | |
| listOfSupportedRadioInterfaces | Value type: RadioInterfacesList | Possible access: Read-Write | Default value: Not specified |
| This attribute describes radio interfaces supported by this Radio Computer. | | | |
| listOfSupportedChannels | Value type: ChannelIDsList | Possible access: Read-Write | Default value: Not specified |
| This attributes describes frequency channels supported by this Radio Computer. | | | |
| hardwareProfile | Value type: HardwareInfo | Possible access: Read-Write | Default value: Not specified |
| This attributes describes hardware capabilities of this Radio Computer. | | | |
| softwareProfile | Value type: SoftwareInfo | Possible access: Read-Write | Default value: Not specified |

TABLE 7-continued

| Class RCCapabilities | |
|---|---|
| This attributes describes software capabilities of this Radio Computer. | |
| CONTAINED IN | RadioComputer |
| CONTAINS | |
| SUPPORTED EVENTS | |

TABLE 8

| Class Channel | |
|---|---|
| This class describes one frequency channel that may or may not have active connections on it. | |
| DERIVED FROM | |
| ATTRIBUTES | |
| CONTAINED IN | RadioComputer |
| CONTAINS | ChannelProfile, ChannelMeasurements |
| SUPPORTED EVENTS | |

TABLE 9

| Class ChannelProfile | | | |
|---|---|---|---|
| This class contains general information about this frequency channel. | | | |
| DERIVED FROM | | | |
| ATTRIBUTES | | | |
| channelID | Value type: NameType | Possible access: Read | Default value: Not specified |

TABLE 9-continued

| Class ChannelProfile | | | |
|---|---|---|---|
| This attribute describes ID of channel. | | | |
| channelFrequencyRange | Value type: FrequencyRange | Possible access: Read | Default value: Not specified |
| This attribute describes a value of channel frequency range. | | | |
| radioInterface | Value type: RadioInterface | Possible access: Read | Default value: Not specified |
| This attribute describes a radio interface. | | | |
| cellID | Value type: NameType | Possible access: Read | Default value: Not specified |
| This attribute describes ID of connected cell. | | | |
| CONTAINED IN | Channel | | |
| CONTAINS | | | |
| SUPPORTED EVENTS | | | |

TABLE 10

| Class ChannelMeasurements | | | |
|---|---|---|---|
| This class contains current measurements related to this frequency channel. | | | |
| DERIVED FROM | | | |
| ATTRIBUTES | | | |
| listOfChannelMeasurements | Value type: ChannelMeasurementsList | Possible access: Read | Default value: Not specified |
| This attribute describes a list of channel measurements. | | | |
| appliedMeasurementsConfiguration | Value type: ConfigurationMeasurements | Possible access: Read | Default value: Not specified |
| This attribute describes configuration option of the MD, e.g. which Antenna(s) have been used, which RF front-end(s) have been used, etc. | | | |
| CONTAINED IN | Channel | | |
| CONTAINS | | | |
| SUPPORTED EVENTS | | | |

TABLE 11

| Class RCConfiguration | |
|---|---|
| This class contains information about the current configuration of Radio Computer. | |
| DERIVED FROM | |
| ATTRIBUTES | |
| CONTAINED IN | RadioComputer |
| CONTAINS | Link [*] |
| SUPPORTED EVENTS | |

TABLE 12

| Class Link | |
|---|---|
| This class contains information about one active Radio Application and corresponding connection between Reconfigurable Radio terminal and RANs. | |
| DERIVED FROM | |
| ATTRIBUTES | |
| CONTAINED IN | RCConfiguration |
| CONTAINS | LinkProfile, LinkMeasurements, RFConfiguration[*], Antenna[*] |
| SUPPORTED EVENTS | |

TABLE 13

| Class LinkProfile | | | |
|---|---|---|---|
| This class contains general information about this active connection. | | | |
| DERIVED FROM | | | |
| ATTRIBUTES | | | |
| linkID | Value type: NameType | Possible access: Read | Default value: Not specified |
| This attribute describes ID of link about activated connection. | | | |
| cellID | Value type: NameType | Possible access: Read-Write | Default value: Not specified |
| This attribute describes ID connected cell. | | | |
| associatedChannelID | Value type: OptionalObjectName | Possible access: Read-Add-Remove | Default value: Not specified |
| This attribute describes ID of associated channel. | | | |
| linkDirection | Value type: Direction | Possible access: Read | Default value: Not specified |
| This attribute describes a direction of link. | | | |
| carrierFrequency | Value type: Frequency Range | Possible access: Read-Write | Default value: Not specified |
| This attribute describes a value of carrier frequency. | | | |
| nominalRFPower | Value type: AnaloguePower | Possible access: Read | Default value: Not specified |
| This attribute describes a value of nominal power. | | | |
| samplingRate | Value type: SamplingRate | Possible access: Read-Write | Default value: Not specified |
| This attribute describes a value of sampling rate. | | | |
| bandwidth | Value type: Bandwidth | Possible access: Read-Write | Default value: Not specified |
| This attribute describes a value of bandwidth. | | | |
| CONTAINED IN | Link | | |
| CONTAINS | | | |
| SUPPORTED EVENTS | | | |

TABLE 14

| Class LinkMeasurements | | | |
|---|---|---|---|
| This class contains current measurements related to this active connection. | | | |
| DERIVED FROM | | | |
| ATTRIBUTES | | | |
| receiveBLER | Value type: RxBLER | Possible access: Read-Write | Default value: Not specified |
| This attribute describes a value of BLER for received data. | | | |
| transmitPower | Value type: TxPower | Possible access: Read-Write | Default value: Not specified |
| This attribute describes a power of transmit signal. | | | |
| receiveSINR | Value type: RxSINR | Possible access: Read-Write | Default value: Not specified |
| This attribute describes a value of SINR for received data. | | | |
| transmittedBits | Value type: TxBits | Possible access: Read-Write | Default value: Not specified |
| This attribute describes transmitted bits. | | | |
| CONTAINED IN | Link | | |
| CONTAINS | | | |
| SUPPORTED | | | |
| EVENTS | | | |

TABLE 15

| Class RFConfiguration | |
|---|---|
| This class contains information about the configuration of RF transceiver. | |
| DERIVED FROM | |
| ATTRIBUTES | |
| CONTAINED IN | Link |
| CONTAINS | TxPath[1], RxPath[1] |
| SUPPORTED | |
| EVENTS | |

TABLE 16

| Class TxPath | | | |
|---|---|---|---|
| This class describes one transmit path. | | | |
| DERIVED FROM | DERIVED FROM | | |
| ATTRIBUTES | | | |
| txStartTime | Value type: TxStartTime | Possible access: Read-Write | Default value: Not specified |
| This attribute defines the time when the transceiver start transmission. | | | |
| txStopTime | Value type: TxStopTime | Possible access: Read-Write | Default value: Not specified |
| This attribute defines the time when the transceiver stop transmission. | | | |
| CONTAINED IN | RFConfiguration | | |
| CONTAINS | | | |
| SUPPORTED | | | |
| EVENTS | | | |

TABLE 17

| Class RxPath | | | |
|---|---|---|---|
| This class describes one receive path. | | | |
| DERIVED FROM | DERIVED FROM | | |
| ATTRIBUTES | | | |
| rxStartTime | Value type: RxStartTime | Possible access: Read-Write | Default value: Not specified |
| This attribute defines the time when the transceiver start reception. | | | |
| rxStopTime | Value type: RxStopTime | Possible access: Read-Write | Default value: Not specified |
| This attribute defines the time when the transceiver stop reception. | | | |
| CONTAINED IN | RFConfiguration | | |
| CONTAINS | | | |
| SUPPORTED | | | |
| EVENTS | | | |

TABLE 18

| Class Antenna | |
|---|---|
| This class contains information about antenna selection. | |
| DERIVED FROM | |
| ATTRIBUTES | |
| CONTAINED IN | Link |
| CONTAINS | AntennaProfile, AntennaMeasurements |
| SUPPORTED | |
| EVENTS | |

TABLE 19

| Class AntennaProfile | | | |
|---|---|---|---|
| This class contains general information about this antenna. | | | |
| DERIVED FROM | | | |
| ATTRIBUTES | | | |
| antennaID | Value type: NameType | Possible access: Read | Default value: Not specified |
| This attribute describes ID of antenna. | | | |
| CONTAINED IN | Antenna | | |
| CONTAINS | | | |
| SUPPORTED | | | |
| EVENTS | | | |

TABLE 20

| Class AntennaMeasurements | | | |
|---|---|---|---|
| This class contains current measurements related to this antenna | | | |
| DERIVED FROM | | | |
| ATTRIBUTES | | | |
| antennaGain | Value type: Gain | Possible access: Read | Default value: Not specified |
| This attribute describes a value of antenna gain | | | |
| CONTAINED IN | Antenna | | |
| CONTAINS | | | |
| SUPPORTED | | | |
| EVENTS | | | |

TABLE 21

| Class RCMeasurements |
| --- |
| This class contains current measurements related to Reconfigurable Radio terminal. |

| DERIVED FROM | | | |
| --- | --- | --- | --- |
| | ATTRIBUTES | | |
| listOfActiveMeasurements | Value type: ActiveMeasurementsList | Possible access: Read-Add-Remove | Default value: Not specified |
| | This attribute describes a list of active measurements. | | |
| CONTAINED IN | RadioComputer | | |
| CONTAINS | | | |
| SUPPORTED | | | |
| EVENTS | | | |

Software Architecture Reference Points

Hereinafter, procedures of interfacing between a RCF and a RA for embodying installation/uninstallation, creating/deleting of instances, and operations of the unified radio application will be explained as examples.

Figure 8:
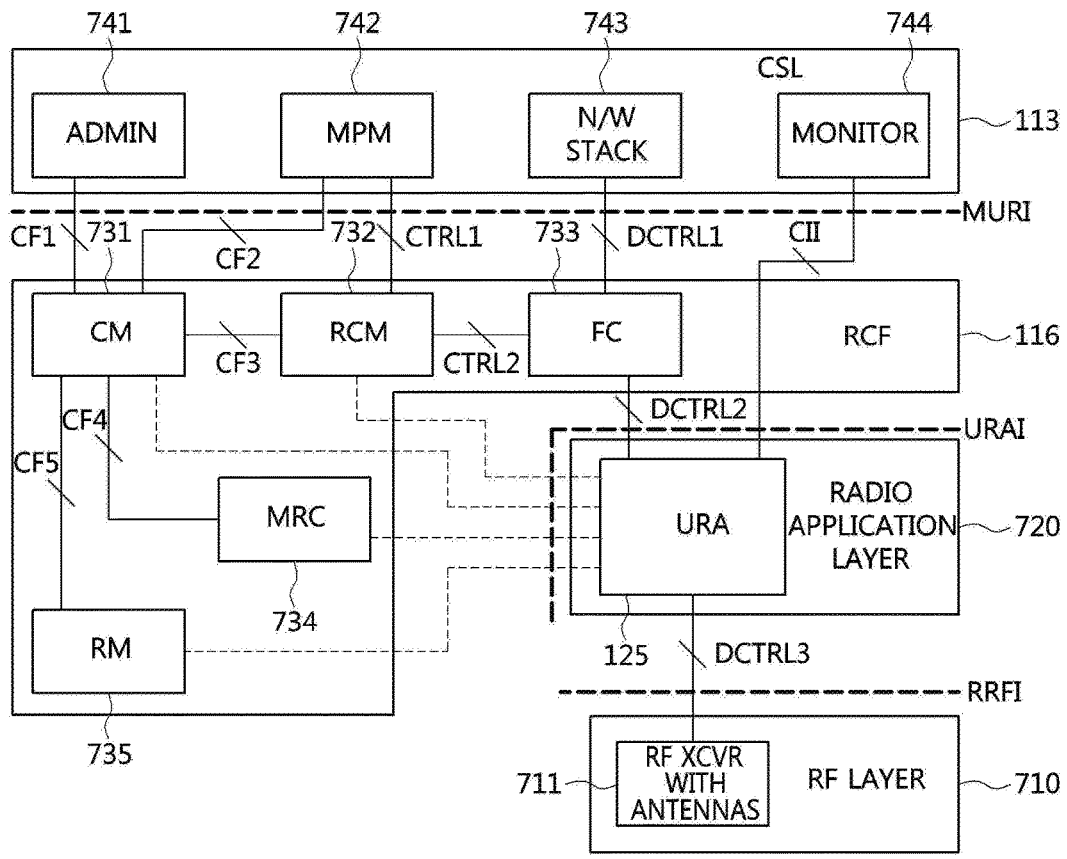
FIG. 8 is a diagram illustrating an overall architecture of reference points for a terminal device according to an embodiment of the present invention.

FIG. 8 is a diagram illustrating an overall architecture of reference points for a terminal device according to an embodiment of the present invention.

In FIG. 8, a RF layer 710 may comprise a RF transceiver with antenna (RF XCVR with antenna) 711, a radio application layer 720 may comprise a URA 125, a RCF 730 may comprise a CM 731, a RCM 732, a FC 733, a MRC 734, and a RM 735, and a CSL 740 may comprise an administrator 741, a MPM 742, a network stack 743, and a monitor 744.

Each solid line CF1, CF2, CF3, CF4, CF5, CTRL1, CTRL2, DCTRL1, DCTRL2, DCTRL3, or CII, between two blocks, denotes a reference point defined between the two blocks through which direct interactions between the two blocks are performed. Meanwhile, each dotted line between two blocks denotes that interactions between the two blocks are performed through radio OS based on commands issued by a corresponding block. As will be explained later, blocks in RCF (i.e. CM, RCM, MRC, and RM) issue the command for the interaction to take place at the unified radio application through the radio OS.

The definition of each reference point is based on the three kinds of interfaces—MURI which are interfaces between components of communication services layer and those of RCF, URAI which are interfaces between URA and component of RCF, and Reconfigurable Radio Frequency Interfaces (RRFI) which are interfaces between URA and Radio Frequency (RF) part. In addition to the MURI, URAI, and RRFI, interfaces between components of RCF have also been defined as reference points. In the present embodiment, the reference points may be classified according to procedures of their functions, such that the classification of each of the reference points becomes coincident with each of the procedures which will be described later.

Reference Point 1: Interfaces for Installation/Uninstallation and Creating/Deleting Instance of RA FIG. 9 is a diagram illustrating an example of reference points for installation/uninstallation and creating/deleting an instance of a radio application in a terminal device of FIG. 8.

Figure 9:
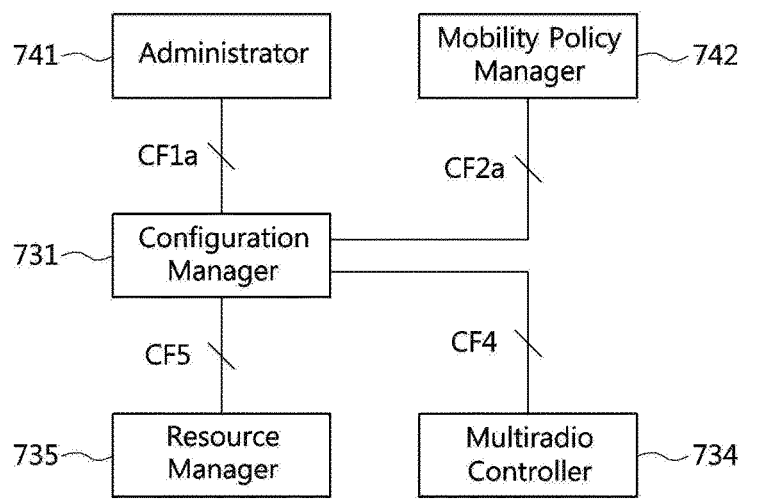
FIG. 9 is a diagram illustrating an example of reference points for installation/uninstallation and creating/deleting an instance of a radio application in a terminal device of FIG. 8.

Referring to FIG. 9, CF1a is an interface between the administrator 741 and the CM 731, which is for the administrator 741 to request the CM 731 to perform installing, uninstalling of RA or for the administrator 741 to receive response of the request from the CM 731.

CF2a is an interface between the MPM 742 and the CM 731, which is for MPM 742 to request the CM 731 to perform creating instance or deleting instance of RA or for the MPM 742 to receive response of the request from the CM 731.

CF4 is an interface between the CM 731 and the MRC 734, which is for the CM 731 to request the MRC 734 to send parameters related to radio resources to the CM 731, or for the CM 731 to receive response of the request (i.e. the parameters related to radio resources) from the MRC 734 during the procedure of creating instance of RA.

CF5 is an interface between the CM 731 and the RM 735, which is for the CM 731 to request the RM 735 to send parameters related to computational resources to the CM 731, or for the CM 731 to receive response of the request (i.e. the parameters related to computational resources) from the RM 735 during the procedure of creating instance of RA.

Reference Point 2: Interfaces for List Checking of Radio Applications

Figure 10:
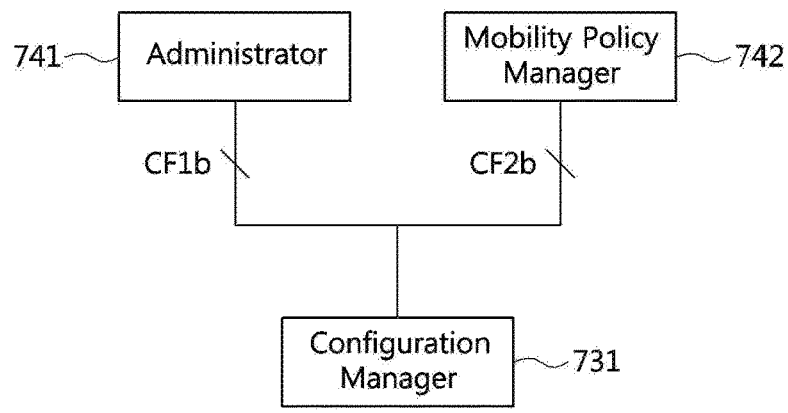
FIG. 10 is a diagram illustrating an example of reference points for obtaining lists of radio applications in a terminal device of FIG. 8.

FIG. 10 is a diagram illustrating an example of reference points for obtaining lists of radio applications in a terminal device of FIG. 8.

Referring to FIG. 10, CF1b is an interface between the administrator 741 and the CM 731, which is for the administrator 741 to request the CM 731 to send the RA list to administrator 741, or for the administrator 741 to receive response of the request (i.e. the RA list) from the CM 731.

Reference Point CF2b is an interface between the MPM 742 and the CM 731, which is for the MPM 742 to request the CM 731 to send the RA list to the MPM 742, or for the MPM 742 to receive response of the request (i.e. the RA list) from the CM 731.

Reference Point 3: Interfaces for Activation/Deactivation of Radio Application

Figure 11:
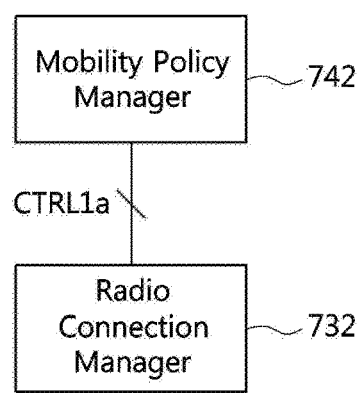
FIG. 11 is a diagram illustrating an example of reference points for activation/deactivation of radio application in a terminal device of FIG. 8.

FIG. 11 is a diagram illustrating an example of reference points for activation/deactivation of radio application in a terminal device of FIG. 8.

Referring to FIG. 11, CTRL1a is an interface between the MPM 742 and the RCM 732, which is for the MPM 742 to request the RCM 732 to perform activation/deactivation of RA, or for the MPM 742 to receive response of the request (i.e. activation/deactivation of RA) from the RCM 732.

Reference Point 4: Interfaces for Transferring Context Information

Figure 12:
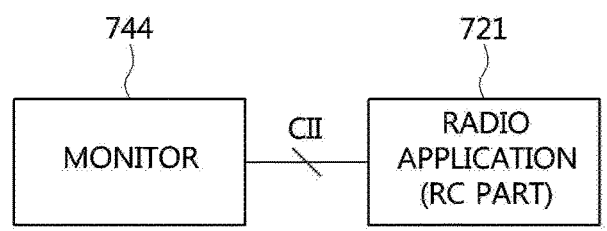
FIG. 12 is a diagram illustrating an example of reference points for transferring context information in a terminal device of FIG. 8.

FIG. 12 is a diagram illustrating an example of reference points for transferring context information in a terminal device of FIG. 8.

Referring to FIG. 12. CII is an interface between the monitor 744 and the RC 721 in RA, which is for the monitor 744 to request the RC 721 in RA to send context information to the monitor 744, or for the monitor 744 to receive response of the request (i.e. the context information) from the RC 721 in RA.

The context information is generated from corresponding function block(s) of RA(s) and transferred to the RC 721. There should be interfaces between RC within a radio application and each of corresponding function blocks. This means that baseband interface (BBI) for transferring context information between the RC and each of the corresponding function blocks should be defined.

Reference Point 5: Interfaces for Creating Data Flow and Sending/Receiving User Data FIG. 13 is a diagram illustrating reference points for creating data flow and sending/receiving user data in a terminal device of FIG. 8.

Figure 13:
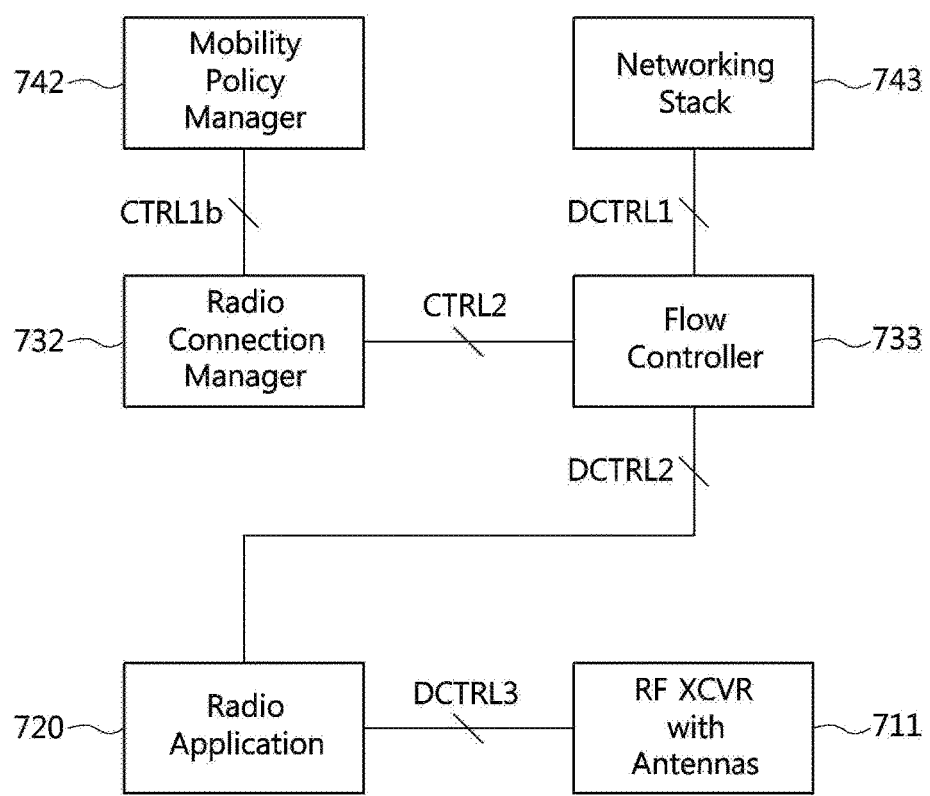
FIG. 13 is a diagram illustrating reference points for creating data flow and sending/receiving user data in a terminal device of FIG. 8.

Referring to FIG. 13, CTRL1b is an interface between the MPM 742 and the RCM 732, which is for the MPM 742 to request the RCM 732 to form data flow or network association with peer equipment, or for the MPM 742 to receive response of the request from the RCM 732.

Reference Point CTRL2 is an interface between the RCM 732 and the FC 733, which is for the RCM 732 to request the FC 733 to form data flow, or for the RCM 732 to receive response of the request from the FC 733.

Reference Point DCTRL1 is an interface between the FC 733 and the networking stack 743, which is for the FC 733 to receive/transfer user data from/to the networking stack 743 for the procedure of sending/receiving data. It also includes an acknowledgement of transmit user data from the FC 733 to the networking stack 743 upon completion of sending data. It also includes an acknowledgement of transmit user data from the FC 733 to the networking stack 743 upon completion of sending data.

Reference Point DCTRL2 is an interface between the FC 733 and the RA 720, which is for the FC 733 to transfer the transmit user data to the RA 720 and to request the RA 720 to transfer the information of transmit user data such as throughput, data bandwidth, etc. to the FC 733. DCTRL2 interface is also used for the FC 733 to receive response of the request from the RA 720. In the case of the procedure of receiving data, DCTRL2 interface is used to transfer the receive user data from the RA 720 to the FC 733.

Reference Point DCTRL3 is an interface between the RA 720 and the RF transceiver (XCVR) with antenna(s), which is for the RA 720 to receive-transfer receive/transmit user data from/to the RF XCVR with antenna.

Software Architecture of Radio Processor Layer

Hereinafter, provided are further detail explanations operational structures of radio applications within the RP layer.

If a RAP is downloaded, user-defined function block code and radio library which should operate on the RP layer are installed so that they can be accessed in the RP layer.

Hereinafter, codes for configuring components which should be executed on the RP layer, including the above-described user-defined function block code, may be referred to as configuration code (or, 'configcodes'). Configcodes may include only user-defined function block code, or may include radio library as well as the user-defined function block code. Configcodes may be in form of executable codes or Intermediate Representation (IR).

Also, hereinafter, a real radio platform is defined as a target radio platform, and a concept of a shadow radio platform is defined as a virtual entity having hardware abstraction on the target radio platform. That is, a shadow radio platform may mean a virtual radio platform into which developers of radio applications virtualize an operation environment of radio applications. For example, a shadow radio platform may be equal to or different from a target radio platform. If the Shadow radio platform is different from the target radio platform, the shadow radio platform may be understood as an abstract device independent of hardware. That is, the shadow radio platform may be a radio virtual machine (RVM).

If the shadow radio platform is different from the target radio platform so that the shadow radio platform becomes RVM, the RVM performs virtualization functions for helping the above-described configcodes to operate on the actual target radio platform. The implementation may include the Back-end Compiler which might provide Just-in-Time (JIT) or Ahead-of-Time (AOT) method for compilation of configcodes into executable codes of the target radio platform.

Figure 14:
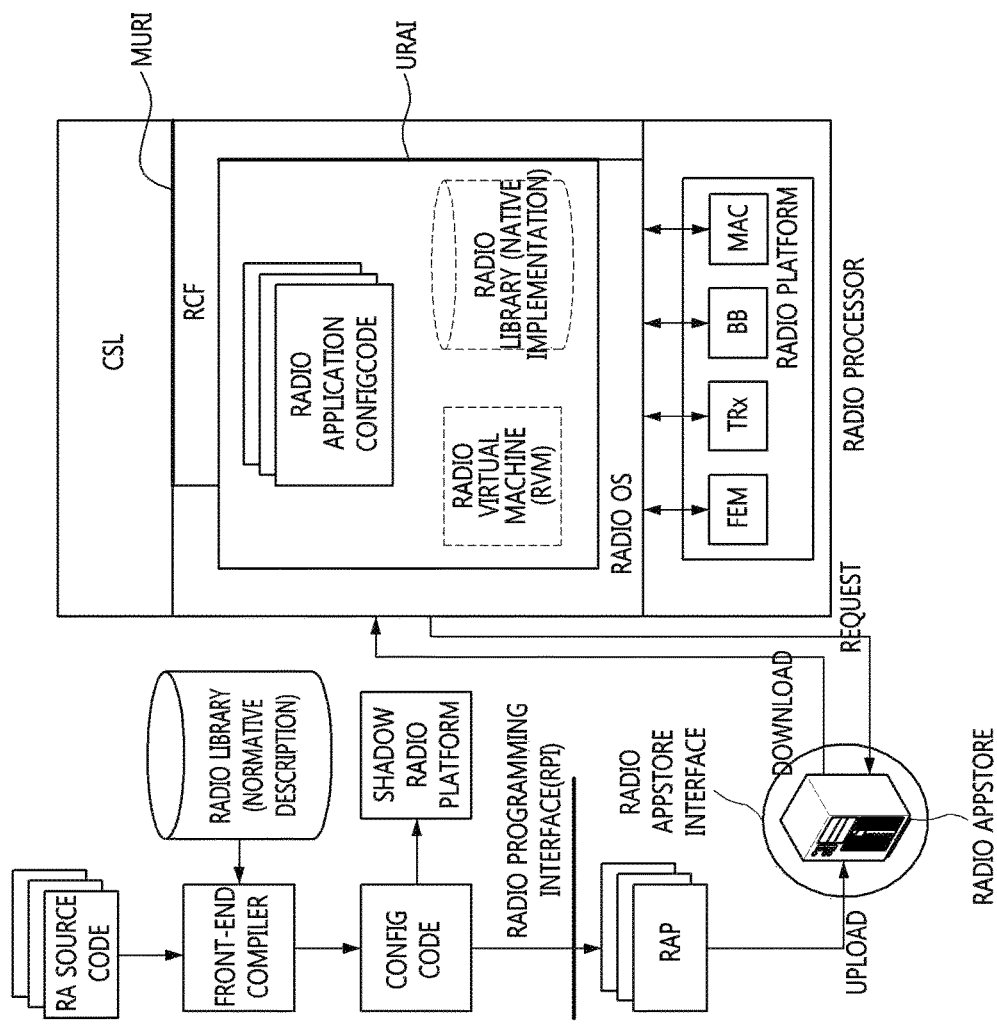
FIG. 14 is a block diagram to explain software architecture of a radio computer according to an embodiment of the present invention.

FIG. 14 is a block diagram to explain software architecture of a radio computer according to an embodiment of the present invention.

The radio computer provides a mobile device with communication capabilities, and the software architecture for the radio computer may be configured to comprise the following components.

Radio OS

The RP layer part of RCF

Implementation of RVM when the shadow radio platform is RVM.

Native implementation of radio library (Radio Lib) when the shadow radio platform is RVM.

Configuration codes (configcodes) of radio applications—configcodes may be provided in form of executable codes of the target radio platform or platform-independent intermediate representation.

The configcodes are interpreted by RVM when the shadow radio platform is equal to RVM, or are equal to executable codes when RVM is equal to the target radio platform.

The RCF and its interfaces such as MURI and URAI have been already explained.

The shadow radio platform can be either RVM or a target radio platform. If the Shadow radio platform is equal to the target radio platform, then front-end compiler will generate executable code for the target radio platform and configcodes is equivalent to the executable code for that radio platform.

The RVM is an abstract machine which is capable of executing configcodes. It is independent of the hardware. The configcodes are executed on a target platform through a specific RVM. Thus, RVM includes a back-end compiler which might provide Just-in-Time (JIT) or Ahead-of-Time (AOT) method for compilation of configcodes into executable codes.

Operational Structure of Unified Radio Applications

Operational structure of unified radio applications 125 and 450 may be represented considering two different cases. One case is when RA configcodes are executable on a target radio platform (illustrated in FIG. 15) and the other case is when RA configcodes are Intermediate Representation (IR) that is to be back-end compiled at a given mobile device (illustrated in FIG. 16).

Figure 15:
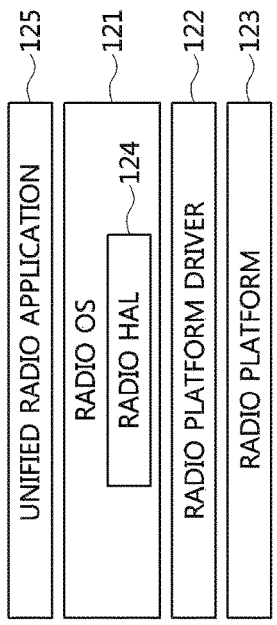
FIG. 15 is a hierarchical structure diagram explaining an example of operational structure of a unified radio application according to an embodiment of the present invention.

FIG. 15 is a hierarchical structure diagram explaining an example of operational structure of a unified radio application according to an embodiment of the present invention.

Referring to FIG. 15, a radio library and user-defined function blocks (UDFB) needed for execution of a given RA may be included in executable configcodes of the RA.

Figure 16:
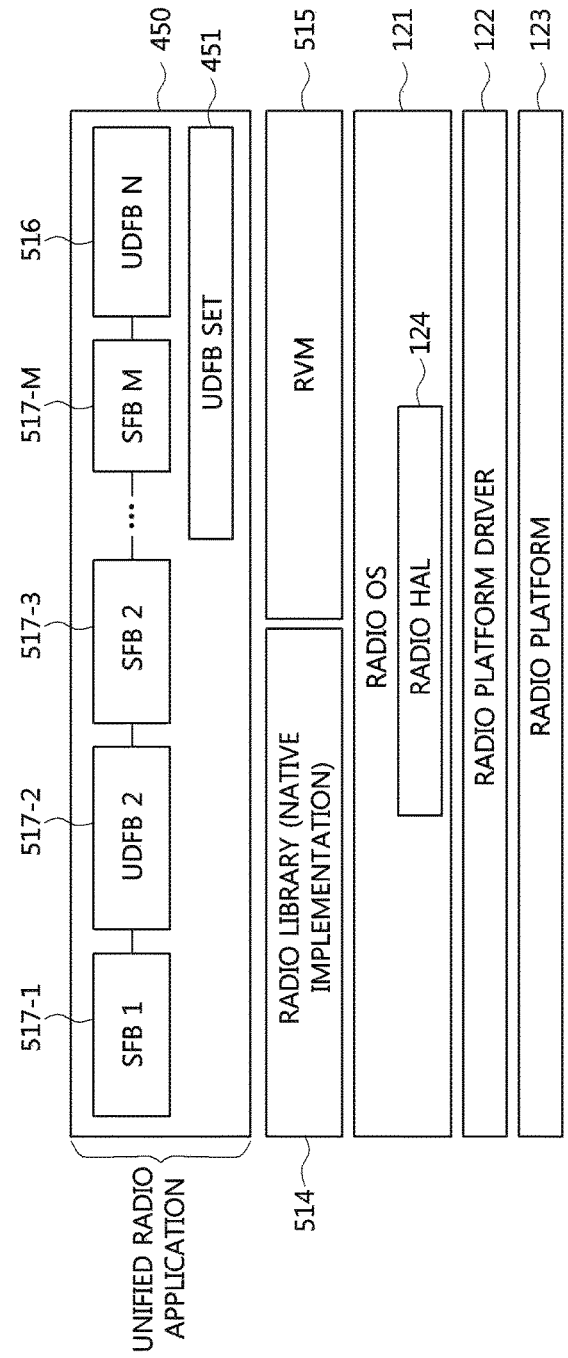
FIG. 16 is a hierarchical structure diagram explaining another example of operational structure of a unified radio application according to an embodiment of the present invention.

Meanwhile, user-defined function blocks needed for execution of a given radio application are included in the configcodes of the radio application, and should be back-end compiled by RVM shown in FIG. 16. In this case, since the radio library cannot be included in the radio application configcodes, a native implementation of the radio library should be additionally prepared in a given mobile device. Usually the native implementation of the radio library is provided by a core chip vendor because the radio library includes standard function blocks (SFB) implemented on the core processor.

The radio library (i.e. native implementation), which can be implemented without hardware accelerator(s), are necessary for enhancing speed of the standard function blocks and for generating other standard function blocks by combining accelerator(s) and program codes.

For both a case when the radio application configcodes are executable codes and a case when the radio application configcodes are intermediate representation, the standard function blocks are supported by dedicated hardware logic accelerator(s) through the radio hardware abstract layer (HAL) shown in FIG. 13 and FIG. 14. That is, every time when the standard function blocks implemented using dedicated hardware logics are called by given radio application codes, the standard function blocks should be executed on the corresponding dedicated hardware logic accelerator(s) through the radio HAL, regardless of whether the radio application configcodes are executable codes or intermediate representation. As explained later, the radio HAL also includes hardware abstraction for interfaces prepared for user-defined function block library(s).

The standard function blocks may be function blocks which are commonly used by various radio applications, for example, a Fast Fourier Transform (FFT) block. Also, the standard function blocks may be function blocks which should be efficiently implemented using a special purpose accelerator in a given radio platform, for example, a turbo coder block.

FIG. 16 is a hierarchical structure diagram explaining another example of operational structure of a unified radio application according to an embodiment of the present invention.

Referring to FIG. 16, the operational structure of unified radio applications may comprise the following components.

The URA 450 includes SFBs 517-1, 517-3, and 517-M and UDFBs 517-2 and 516 in accordance with the contents of metadata in a given RAP.

Radio Library (native implementation) 514 contains configcodes of SFBs that are to be implemented on programmable hardware while the SFBs that are to be implemented using dedicated hardware logic accelerator(s) are supported by Radio HAL 431.

Radio Virtual Machine 515 is a controlled execution environment for software affecting radio characteristics of the terminal device. Using the RVM, a situation in which reconfigurable software (i.e. radio application) is loaded to the RVM can be supposed.

UDFB set 451 includes all the UDFBs to be used in a given RAP and is in general provided by RA provider. UDFB is included in RAP together with metadata and RC code. Since UDFB is generally a modified and/or extended version of SFB, UDFB may have a dependency on SFB library(-ies).

The radio HAL 431 is to abstract the radio platform 123. The radio HAL 431 supports SFB to be implemented using dedicated hardware logic accelerator in order for each of those SFBs to be implemented directly on corresponding dedicated hardware logic accelerator(s).

The radio platform driver 122 is for the radio OS 121 to recognize the radio platform 123.

The radio platform 123 in general consists of both programmable hardware and dedicated hardware accelerator(s).

On the other hand, the above described UDFB set 451 may include all user defined function blocks which are used by given radio application(s). It is important that any standard function block can be modified and/or extended by replacing it with a proper standard function block which is a modified and/or extended version of the standard function block to be replaced. Therefore, some user-defined function blocks can be good candidates for standard function block extension, which means they might be added as standard function blocks later. In that case, after addition, they will be defined as the normal standard function blocks.

Also, since the user-defined function block Set (UDFB set) is to be provided by radio application provider, i.e. 3rd party, instead of radio platform vendor, in order for radio control framework to be able to perform basic controls of every UDFB's event and/or command, a standard set of control interfaces such as "start", "stop", "pause", "get-_port" and "initialize" may have to be specified for the corresponding user-defined function blocks. For this purpose, an ETSI RRS may specify a standard set of control interfaces for each user-defined function block to be implemented properly via the standard set of control interfaces. Specification of the standard control interfaces for user-defined function blocks may be given in the document of Protocol/Interface technical specification (TS). The radio platform 123 shown in FIG. 16 and FIG. 17 generally comprise both core(s) and dedicated hardware accelerator(s) for implementing each of function blocks.

Figure 17:
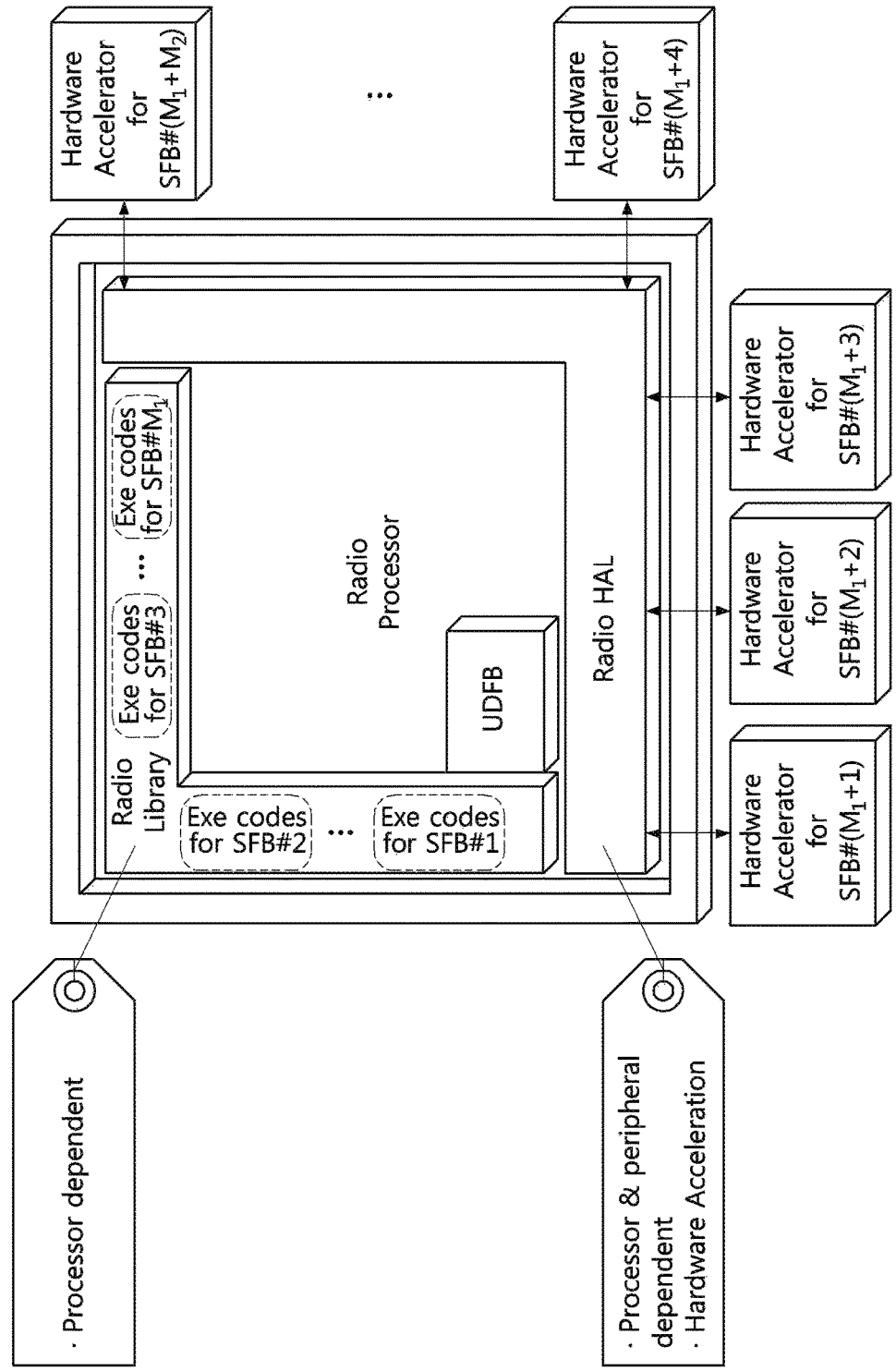
FIG. 17 is a conceptual diagram explaining implementations of function block library of a radio platform of a terminal device according to an embodiment of the present invention.

FIG. 17 is a conceptual diagram explaining implementations of function block library of a radio platform of a terminal device according to an embodiment of the present invention.

In an embodiment, illustrated are implementations of function blocks on a given radio platform which consists of core(s) and various kinds of peripheral devices.

Referring to FIG. 17, the number of standard function blocks implemented on the radio processor has been set to M1 and the number of standard function blocks implemented on hardware logic accelerators has been set to M2. As mentioned earlier, standard function blocks to be implemented using dedicated hardware logic accelerator such as FFT. Turbo decoder, Multi-Input-Multi-Output (MIMO) decoder, etc. can be implemented directly on the corresponding dedicated hardware logic accelerator for high performance and low power consumption. Those standard function blocks are supported by the radio HAL for implementation on the dedicated accelerator(s). This means that, when each of standard function blocks to be implemented on the dedicated accelerator is called in a radio application, it is executed directly on the corresponding dedicated accelerator through the radio HAL. Similarly, when each of standard function blocks to be implemented on core processor such as bit-reverse, multiply and accumulation, etc., is called in RA, it is executed on a given core (e.g. ARM with Neon).

Consequently, the execution codes required on a radio processor consists of the following two parts. One part is execution codes for standard function blocks executed on programmable core(s) and the other part is radio HAL codes for standard function blocks implemented on dedicated accelerators.

This can be summarized as follows. {C: execution code required on RP for SFB implementation}={A: execution codes for SFBs implemented on programmable cores}+{B: Radio HAL codes for SFBs implemented on accelerators}. That is. C=A+B where A and B may be determined by each vendor.

This may also mean that {SFBs} is a union of {SFBs implemented on core processor} and {SFBs implemented on dedicated hardware accelerators}, and an intersection of {SFBs implemented on core processor} and {SFBs implemented on dedicated hardware accelerators} is an empty set.

Meanwhile. UDFB, as mentioned earlier, should be written with standard interfaces. As shown in FIG. 17, it should be observed that the standard interfaces of UDFB might be associated with either SFB(s) implemented on core processor or SFB(s) implemented on dedicated hardware accelerator, or both.

The reason why we classify standard interfaces into two groups, i.e. the one corresponding to SFB(s) implemented on core processor and the other corresponding to SFB(s) implemented on dedicated hardware accelerator, is that each category has its own pros and cons. The latter, since it is implemented on dedicated hardware logic, is advantageous for power consumption, speed-up operation, and, probably, cost-effectiveness. On the contrary, the former, since it is implemented on microprocessor, is advantageous mainly for flexibility. It is expected that the dedicated hardware accelerator(s) will be used relatively more widely at the beginning stage until programmable devices become competitive to dedicated hardware devices in performance. As semiconductor technology evolves more and more, the core-dependent SFB will gradually become more and more dominant compared to the core-and-peripheral-dependent SFB in a long term standpoint and be implemented via Instruction Set Architecture (ISA)-level acceleration.

The granularity of the standard function blocks shown in the present specification are just for the purpose of explanation, and the standard function block interfaces may be defined in other documents, as mentioned earlier.

Composition of Radio Application Package (RAP)

Hereinafter, composition of a radio application package (RAP) for distribution of a radio application according to the present invention will be explained in detail.

Figure 18:
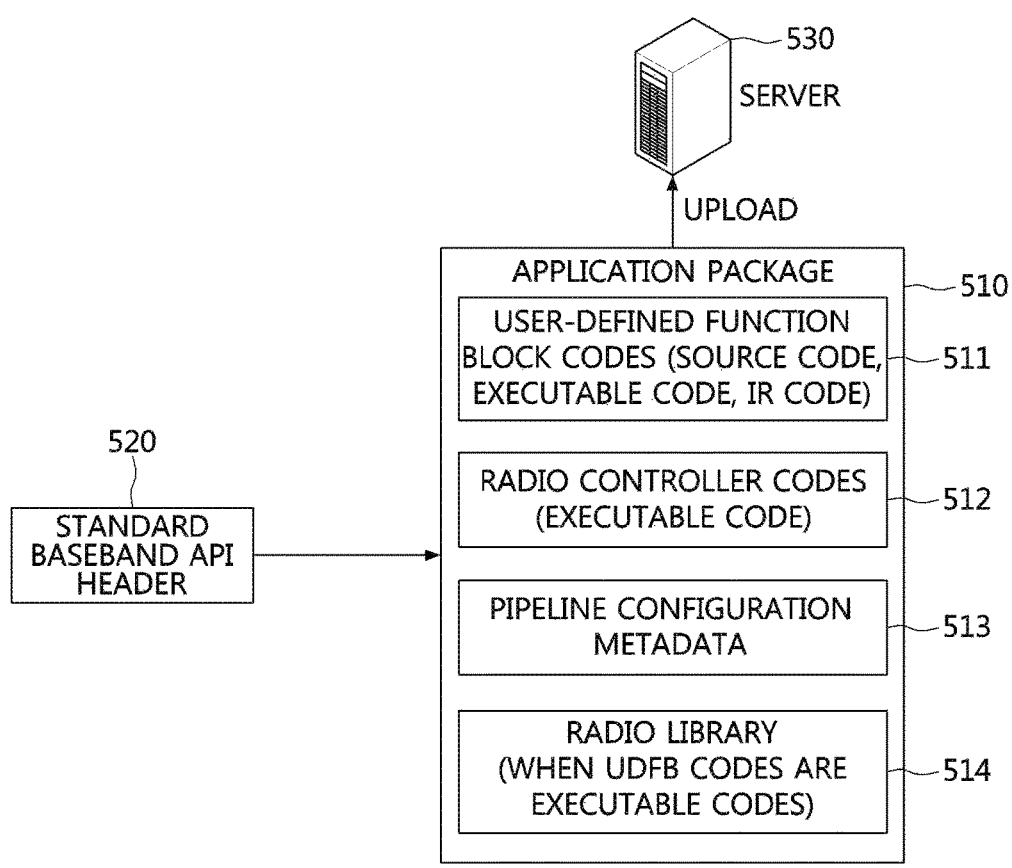
FIG. 18 is a block diagram to explain a configuration example of a radio application package which can be applied to a terminal device according to an embodiment of the present invention.

FIG. 18 is a block diagram to explain a configuration example of a radio application package which can be applied to a terminal device according to an embodiment of the present invention.

Referring to FIG. 18, at least one RA of a RAP according to the present invention may comprise function blocks and a radio controller. That is, a RAP 510 may be configured to comprise user-defined function block codes 511, radio library, and radio controller codes 512 for them. Thus, the RAP 510 for distribution of radio application may basically comprise user-defined function block codes 511 and radio controller codes 512. Also, it may further comprise pipeline configuration metadata 513.

The radio controller codes 512 may be determined to be included in the RAP in executable code form of either the RP or the AP according to the above-described software architecture environment. That is, if the RCF is divided into the AP layer part and the RP layer part, the radio controller codes may be configured as codes executable on the AP. Otherwise, if the RCF is executed only on the RP, the radio controller codes may be configured as codes executable on the RP. Meanwhile, the user-defined function block codes 511 are codes which always operate on the RP, and so the RAP may include the user-defined function block codes in executable code form of the radio processor, in source code form, or in IR form.

A pipeline means a combination of radio controller, user-defined function blocks, and standard function blocks for implementing transmission or reception functions of the RA and their relations, and may be defined based on the pipeline configuration metadata.

Also, if the standard function block codes are configured as codes executable on cores of the RP, the RAP 510 may be configure to further comprise radio library 514 in executable code form (executable code of the radio processor cores) as explained earlier.

The RAP 510 may be downloaded from a server 530 onto the OS of the AP layer, and the user-defined function block codes 512 and the radio library 514 may be loaded from the AP to the RP by referring to the pipeline configuration metadata, and finally loaded to the radio OS on the RP layer.

The above-described methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present invention, and vice versa.

While embodiments of the present disclosure and their advantages have been described in detail above, it should be understood that various changes, substitutions and alterations may be made herein without departing from the scope of the disclosure.

The invention claimed is:

1. A method for executing a radio application independent of a modem, performed in a terminal device, the method comprising:

communicating with each other using a reconfigurable radio frequency interface (RRFI) by a unified radio application (URA), which operates on a radio computer of the terminal device, and a radio frequency (RF) transceiver, which operates in a radio platform on the radio computer; and supporting, by the RRFI, a service set comprising a radio virtual machine (RVM) protection service, a spectrum control service, a power control service, an antenna management service, and a transmission/reception chain control service, wherein the service set supported by the RRFI is configured differently according to a mobile device reconfiguration class (MDRC) of the terminal device, and wherein the RVM protection service includes at least one of selection of RF protection class, request of RF protection class status, request for change of RF protection classes, RF front-end indication of modification of input data signals, RF front-end emergency switch off, and information on cross radio access technology interference.

2. The method according to claim 1, wherein the RRFI is used in parallel with or complementarily to other radio frequency interface defining physical interconnections between a baseband processing part and a RF integrated circuit of the terminal device.

3. The method according to claim 1, wherein the RRFI provides a first interface for configuration of the RF transceiver, and the first interface allows at least one of the URA and the RF transceiver to change control information and data between the URA and the RF transceiver according to a radio spectrum environment.

4. The method according to claim 3, wherein the RRFI provides a seventh interface for unified representation of control information, and the seventh interface allows control information through a RF front-end connected to the RF transceiver to be represented in a unified format for handling of the RF front-end.

5. The method according to claim 3, wherein the RRFI provides an eighth interface for unified representation of a data payload, and the eighth interface allows the data payload passing through a RF front-end connected to the RF transceiver to be represented in a unified format for data handling of the RF front-end.

6. The method according to claim 3, wherein the RRFI provides a ninth interface for selection of a RF protection class which is introduced for tradeoffs between an effort for certification or re-certification and flexibility of a RF front-end connected to the RF transceiver, and the flexibility of the RF front-end includes band selection, bandwidth selection, limitation on out-of-band (OOB) emission, or a combination of them.

7. The method according to claim 1, wherein the RRFI provides a second interface for extension of a multi-antenna system, and the second interface allows the URA to select a number of physical input antennas or physical output antennas according to radio environments.

8. The method according to claim 1, wherein the RRFI provides a third interface for capability of multiple frequency bands, and the third interface supports a plurality of radio applications using different frequency bands.

9. The method according to claim 1, wherein the RRFI provides a fourth interface for reconfiguration of the RF transceiver, and the fourth interface allows the RF transceiver to manage at least one output signal or received signal from at least one radio application or to the URA.

10. The method according to claim 1, wherein the RRFI provides a fifth interface for interworking of radio resources, and the fifth interface supports a plurality of radio applications to share the radio resources.

11. The method according to claim 1, wherein the RRFI provides a sixth interface for testing radio equipment, the sixth interface supports a test mode having a capability of testing a RF path without emission of radio waves, and the test mode includes a loop-back mode in which a transmission chain connected to the RF transceiver is connected to a reception chain.

12. The method according to claim 1, wherein the RRFI is based on an extension of classes of the radio computer, and the classes of the radio computer include RCMeasurements class, RCConfiguration class and subclasses thereof, Channel class and subclasses thereof, and RCCapabilities class.

13. The method according to claim 12, wherein the RRFI connects a RVM software component and a baseband implementation integrated circuit of a baseband processing part of the terminal device with a chain of the RF transceiver or a RF front-end.

14. A terminal device for executing a radio application independent of a modem, comprising:
a unified radio application (URA) operating in a radio computer of the terminal device;
a radio frequency (RF) transceiver operating in a radio platform of the radio computer; and
a reconfigurable radio frequency interface (RRFI) connecting the URA and the RF transceiver, and supporting a service set comprising a radio virtual machine (RVM) protection service, a spectrum control service, a power control service, an antenna management service, and a transmission/reception chain control service,
wherein the service set supported by the RRFI is configured differently according to a mobile device reconfiguration class (MDRC) of the terminal device, and
wherein the RVM protection service includes at least one of selection of RF protection class, request of RF protection class status, request for change of RF protection classes, RF front-end indication of modification of input data signals, RF front-end emergency switch off, and information on cross radio access technology interference.

15. The terminal device according to claim 14, wherein the RRFI is used in parallel with or complementarily to other radio frequency interface defining physical interconnections between a baseband processing part and a RF integrated circuit of the terminal device.

16. The terminal device according to claim 15, further comprising the baseband processing part including a RVM software component selecting a radio frequency and a RVM protection class, and a baseband implementation integrated circuit, and a RF front-end chain or a RF transceiver chain connected with the baseband processing part via a digital interface, wherein the RVM software component and the baseband implementation integrated circuit communicate with the RF front-end chain or the RF transceiver chain via the RRFI.

17. The terminal device according to claim 14, wherein the spectrum control service includes configuration of a center frequency, configuration of a bandwidth, and configuration of a sampling rate.

18. The terminal device according to claim 14, wherein the RRFI includes a first interface for the spectrum control service, the URA transmits, via the first interface, to the RF transceiver a message for requesting configuration of a center frequency, a bandwidth, or a sampling rate, and the RF transceiver transmits, via the first interface, to the URA a message for confirming the configuration of the center frequency, the bandwidth, or the sampling rate, or indicating a failure of the configuration of the center frequency, the bandwidth, or the sampling rate.

* * * * *